US011279022B2

(12) United States Patent
Guerin et al.

(10) Patent No.: US 11,279,022 B2
(45) Date of Patent: Mar. 22, 2022

(54) ROBOT CONTROL, TRAINING AND COLLABORATION IN AN IMMERSIVE VIRTUAL REALITY ENVIRONMENT

(71) Applicant: The Johns Hopkins University, Baltimore, MD (US)

(72) Inventors: Kelleher Guerin, Baltimore, MD (US); Gregory D. Hager, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 88 days.

(21) Appl. No.: 16/433,162

(22) Filed: Jun. 6, 2019

(65) Prior Publication Data
US 2019/0283248 A1     Sep. 19, 2019

Related U.S. Application Data

(63) Continuation of application No. 15/480,135, filed on Apr. 5, 2017, now Pat. No. 10,350,751, which is a continuation of application No. 14/638,973, filed on Mar. 4, 2015, now Pat. No. 9,643,314.

(51) Int. Cl.
*B25J 9/16*     (2006.01)

(52) U.S. Cl.
CPC ........... *B25J 9/1605* (2013.01); *B25J 9/1671* (2013.01); *G05B 2219/40131* (2013.01); *G05B 2219/45097* (2013.01); *Y10S 901/05* (2013.01)

(58) Field of Classification Search
CPC .................. B25J 9/1671; B25J 9/1605; G05B 2219/40131; G05B 2219/45097; Y10S 901/05
See application file for complete search history.

(56) References Cited

U.S. PATENT DOCUMENTS

| 9,272,418 B1* | 3/2016 | Guerin ..................... B25J 9/163 |
| 9,393,687 B2 | 7/2016 | Hietmann et al. |
| 2001/0002098 A1 | 5/2001 | Haanpaa et al. |

(Continued)

FOREIGN PATENT DOCUMENTS

| EP | 2363775 A1 | 9/2011 |
| WO | 2005/039837 A1 | 5/2005 |
| WO | 2010/075481 A1 | 7/2010 |

OTHER PUBLICATIONS

Ameri et al., "Augmented reality meets industry: Interactive robot programming," in SIGRAD 2010, Nov. 2010, pp. 55-58.

(Continued)

*Primary Examiner* — Nicholas Kiswanto
(74) *Attorney, Agent, or Firm* — Venable LLP; Henry J. Daley

(57) ABSTRACT

System and methods to create an immersive virtual environment using a virtual reality system that receives parameters corresponding to a real-world robot. The real-world robot may be simulated to create a virtual robot based on the received parameters. The immersive virtual environment may be transmitted to a user. The user may supply input and interact with the virtual robot. Feedback such as the current state of the virtual robot or the real-world robot may be provided to the user. The user may train the virtual robot. The real-world robot may be programmed based on the virtual robot training.

11 Claims, 25 Drawing Sheets

(56) References Cited

U.S. PATENT DOCUMENTS

| | | |
|---|---|---|
| 2002/0133264 A1 | 9/2002 | Maiteh et al. |
| 2004/0175684 A1 | 9/2004 | Kaasa et al. |
| 2004/0189631 A1 | 9/2004 | Kazi et al. |
| 2009/0273665 A1 | 11/2009 | Kleindienst |
| 2012/0290130 A1 | 11/2012 | Kapoor |
| 2013/0211592 A1 | 8/2013 | Kim |
| 2015/0127151 A1 | 5/2015 | Riedel et al. |
| 2015/0364060 A1 | 12/2015 | Gupta et al. |
| 2016/0046023 A1 | 2/2016 | Nagendran et al. |

OTHER PUBLICATIONS

Aryania, B. Daniel, T. Thomessen, and G. Sziebig, "New trends in industrial robot controller user interfaces," in Cognitive Infocommunications (CogInfoCom), 2012 IEEE 3rd International Conference on. IEEE, 2012, pp. 365-369.

Belousov, R. Chellali, and G. J. Clapworthy Virtual reality tools for internet robotics, vol. 2, pp. 1878-1883, 2001.

Burdea. Invited review: the synergy between virtual reality and robotics. Robotics and Automation, IEEE Transactions on, 15:400-410, 1999.

Calinon, "Robot programming by demonstration," in Springer handbook of robotics. Springer, 2008, pp. 1371-1394.

Ferland, F. Pomerleau, C. T. Le Dinh, and F. Michaud, "Egocentric and exocentric teleoperation interface using real-time, 3d video projection," in Human-Robot Interaction (HRI), 2009 4th ACM/IEEE International Conference on. IEEE, 2009, pp. 37-44.

Freund and J. Rossmann Projective virtual reality: Bridging the gap between virtual reality and robotics. Robotics and Automation, IEEE Transactions on, 15:411-422, 1999.

Funda and R. P. Paul. Efficient control of a robotic system for time-delayed environments, pp. 219-224, 1991.

Hamon, P. Lucidarme, E. Richard, and P. Richard, "Virtual reality and programming by demonstration: Teaching a robot to grasp a dynamic object by the generalization of human demonstrations," Presence: Teleoperators and Virtual Environments, vol. 20, No. 3, pp. 241-253, 2011.

Hulin, V. Schmirgel, E. Yechiam, U. E. Zimmermann, C. Preusche, and G. Pohler, "Evaluating exemplary training accelerators for programming-by-demonstration," in RO-MAN, 2010 IEEE. IEEE, 2010, pp. 440-445.

Jacoby and S. R. Ellis, "Using virtual menus in a virtual environment," in SPIE/IS&T 1992 Symposium on Electronic Imaging: Science and Technology. International Society for Optics and Photonics, 1992, pp. 39-48.

Kadavasal, A. Seth, and J. H. Oliver. Virtual reality based multimodal teleoperation using mixed autonomy. ASME Conference Proceed-ings, 2008:1451-1460, 2008.

Kazi, J. Bunsendal, D. Haag, R. Baum, and R. Bischoff, "Next generation teach pendants for industrial robots," in Advances in Human-Robot Interaction. Springer, 2005, pp. 47-66.

Kheddar, E.-S. Neo, R. Tadakuma, and K. Yokoi, vol. 31, chap-ter Enhanced Teleoperation Through Virtual Reality Techniques, pp. 139-159. 2007.

Lambrecht, M. Kleinsorge, M. Rosenstrauch, and J. Krüger, "Spatial programming for industrial robots through task demonstration " International Journal of Advanced Robotic Systems, vol. 10, 2013.

Milgram, A. Rastogi, and J. J. Grodski, "Telerobotic control using augmented reality," in Robot and Human Communication, 1995. RO-MAN'95 Tokyo, Proceedings., 4th IEEE International Workshop on. IEEE, 1995, pp. 21-29.

Milgram, S. Zhai, D. Drascic, and J. J. Grodski. Applications of augmented reality for human-robot communication, vol. 3, pp. 1467-1472, 1993.

Miner and S. A. Stansfield, "An interactive virtual reality simulation system for robot control and operator training," in Robotics and Automation, 1994. Proceedings., 1994 IEEE International Conference on. IEEE, 1994, pp. 1428-1435.

Monferrer and D. Bonyuet. Cooperative robot teleoperation through virtual reality interfaces, pp. 243-248, 2002.

Ong, J. Chong, and A. Y. Nee, "Methodologies for immersive robot programming in an augmented reality environment," in Proceedings of the 4th international conference on Computer graphics and interactive techniques in Australasia and Southeast Asia. ACM, 2006, pp. 237-244.

Pettersen, J. Pretlove, C. Skourup, T. Engedal, and T. Lokstad, "Augmented reality for programming industrial robots," in Mixed and Augmented Reality, 2003. Proceedings. The Second IEEE and ACM International Symposium on, Oct. 2003, pp. 319-320.

Pieska, J. Kaarela, and O. Saukko, "Towards easier human-robot interaction to help inexperienced operators in smes," in Cognitive Infocommunications (CogInfoCom), 2012 IEEE 3rd International Conference on, Dec. 2012, pp. 333-338.

Quigley, K. Conley, B. Gerkey, J. Faust, T. Foote, J. Leibs, R. Wheeler, and A. Y. Ng, "Ros: an open-source robot operating system," in ICRA workshop on open source software, vol. 3, No. 3.2, 2009.

Rahimi and W. Karwowski, "A research paradigm in human-robot interaction," International journal of industrial ergonomics, vol. 5, No. 1, pp. 59-71, 1990.

Rosenberg, "Virtual fixtures: Perceptual tools for telerobotic manipulation," in Virtual Reality Annual International Symposium, 1993., 1993 IEEE. IEEE, 1993, pp. 76-82.

Savage-Carmona, M. Billinghurst, and A. Holden. The virbot: a virtual reality robot driven with multimodal commands. Expert Systems with Applications, 15:413-419, 1998.

Scholtz, "Theory and evaluation of human robot interactions," in System Sciences, 2003. Proceedings of the 36th Annual Hawaii International Conference on IEEE, 2003, pp. 10-19.

Sheik-Nainar, D. B. Kaber, and M.-Y. Chow. Control gain adaptation in virtual reality mediated human-telerobot interaction. Human Factors and Ergonomics in Manufacturing & Service Industries, 15:259-274, 2005.

Slater, V. Linakis, M. Usoh, and R. Kooper, "Immersion, presence, and performance in virtual environments: An experiment with tri-dimensional chess," in ACM virtual reality software and technology (VRST). Citeseer, 1996, pp. 163-172.

Tachi, H. Arai, and T. Maeda, "Tele-existence simulator with arlificial reality (1)-design and evaluation of a binocular visual display using solid models-," in Intelligent Robots, 1988., IEEE International Workshop on, Oct. 1988, pp. 719-724.

Takahashi and H. Ogata. Robotic assembly operation based on task-level teaching in virtual reality, pp. 1083-1088, 1992.

Yamada, N. Tao, and Z. Dingxuan. Construction tele-robot system with virtual reality, pp. 36-40, 2008.

\* cited by examiner

US 11,279,022 B2

ROBOT CONTROL, TRAINING AND COLLABORATION IN AN IMMERSIVE VIRTUAL REALITY ENVIRONMENT

CROSS-REFERENCE TO RELATED APPLICATIONS

This application is a continuation of U.S. patent application Ser. No. 15/480,135, filed on Apr. 5, 2017, now U.S. Pat. No. 10,350,751, issued on Jul. 16, 2019, which is a continuation of U.S. patent application No. 14/638,973, filed on Mar. 4, 2015, now U.S. Pat. No. 9,643,314, issued on May 9, 2017, the entire contents of which are hereby incorporated by reference.

This invention was made with government support under contract number 1227277 awarded by The National Science Foundation (NSF). The government has certain rights in the invention.

FIELD OF INVENTION

Embodiments relate to programming dexterous entities and more specifically to robot training in a virtual reality environment.

SUMMARY

Aspects of the invention may involve systems, devices, and methods. In one embodiment, a method may be provided for programming a robot. The method may include creating an immersive virtual environment (IVE) using a virtual reality system (VRS); receiving, by the VRS, parameters corresponding to a real-world robot; creating, by the VRS within said IVE, a virtual robot, wherein the virtual robot is a simulation of the real-world robot based on the received parameters; transmitting, by the VRS, a representation of said IVE to a user; receiving, by the VRS, input from the user, wherein said VRE is configured to allow the user to interact with the virtual robot using said user input; providing, by the VRS within said IVE, robot feedback to the user, wherein said robot feedback includes a current state of the virtual robot; training, in the VRS, the virtual robot in the IVE by the user; and programming, by the VRS, the real-world robot based on the virtual robot training.

In another embodiment, a system to program a robot may be provided. The programming system may include a dexterous machine with at least one articulating arm; a processor operable to perform instructions to: create an immersive virtual environment (IVE); receive parameters corresponding to the dexterous machine; create in said IVE a virtual representation of said dexterous machine based on the parameters; transmit said IVE to a user; receive input from the user, wherein said input includes interactions of the user with objects within the IVE; providing in said IVE feedback from said dexterous machine, wherein said feedback includes a current state of said dexterous machine; and transmit programming instructions to said dexterous machine.

BRIEF DESCRIPTION OF THE DRAWINGS

The foregoing and other features and advantages of the invention will be apparent from the following, more particular description of various exemplary embodiments, as illustrated in the accompanying drawings wherein like reference numbers generally indicate identical, functionally similar, and/or structurally similar elements. The first digits in the reference number indicate the drawing in which an element first appears.

DESCRIPTION OF THE EMBODIMENTS

Figure 1:
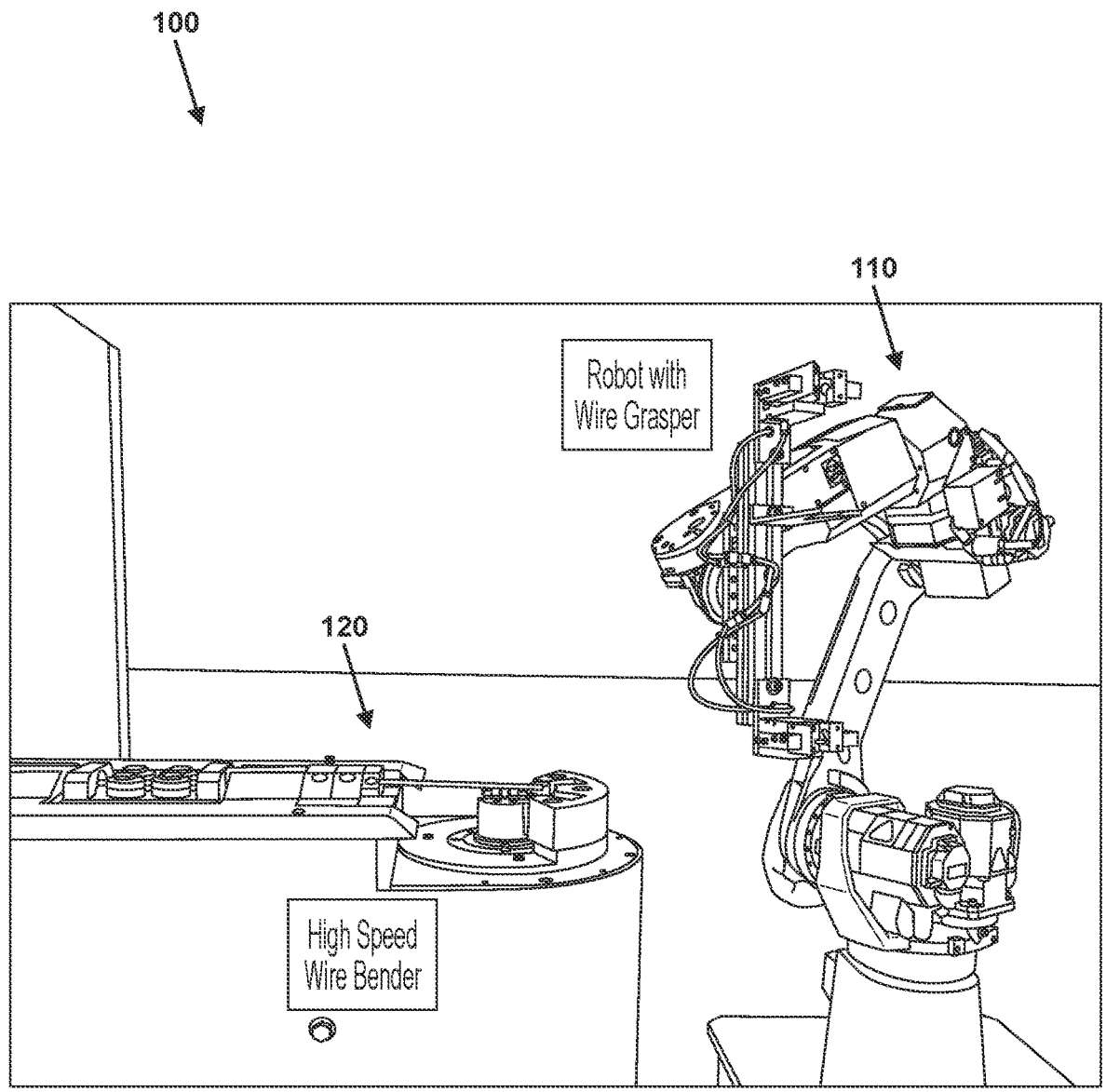
FIG. 1 depicts an example real-world robot with a wire grasper.

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. A person skilled in the relevant art will recognize that other components and configurations may be used without parting from the spirit and scope of the embodiments. A person skilled in the relevant art will recognize that the various embodiments or components of the various embodiments may be combined and/or partially combined. It is to be understood that each specific element includes all technical equivalents that operate in a similar manner to accomplish a similar purpose. The examples and embodiments described herein are non-limiting examples.

All publications cited herein are hereby incorporated by reference in their entirety.

As used herein, the term "a" refers to one or more. The terms "including," "for example," "such as," "e.g.," "may be" and the like, are meant to include, but not be limited to, the listed examples. The term "dexterous entity" may refer to a robot such as a robotic arm or any robot that may move and require programming. The term "immersive virtual environment" may refer to a virtual reality environment disconnected from the real-world, augmented reality where visual images and/or audio may be introduced or projected into the real-world, and/or augmented virtuality where real world objects are represented in a virtual world. An immersive virtual environment (IVE), Immersive Virtual Robotic Environment (IVRE), or Virtual Reality Environment (VRE) may be any immersive digital workspace. This may include stereoscopic 3D displays on a monitor as well as VR headsets (such as the Oculus Rift™) or augmented reality (AR) devices such as Google Glass™. These may contain 3D models, point clouds, meshes, as well as articulated 3D avatars or proxies for both the user or any other kinematic system (such as a robot).

While robotics technology has become the backbone of manufacturing over the past several decades, small manufacturing entities (SMEs) still face challenges when trying to integrate robotic systems into their production pipelines. For example, in order for SMEs to benefit from robotic technology, they require systems with high flexibility, rapid programmability, and cost effectiveness without the economy of scale. Efforts to improve industrial robot programming have not provided the flexibility required for small scale, short run change-out tasks performed by SMEs. Immersive Virtual Reality (VR) has the potential to provide the flexible human-robot interaction tools required by the dynamic human-robot interaction patterns of SMEs. The IVRE interaction paradigm may provide a set of requirements and design patterns for developing VR interfaces for flexible industrial human-robot interaction.

Robotics technology has become the backbone of manufacturing over the course of the past several decades, yet small manufacturing entities (SMEs) are characterized by a number of requirements which distinguish them from more canonical manufacturing contexts. In order for SMEs to benefit from robotic technology, systems with high flexibility, rapid programmability, and cost effectiveness without the economy of scale may be needed. These requirements, along with the constraints imposed by the industrial environment, necessitate a paradigm for how human operators program, collaborate and generally interact with robots which may be different than many other human-robot interaction (HRI) domains.

What is needed is a method for improved control, training and collaboration with a robotic system using a Virtual Reality Environment (VRE). Current methods of programming robots for a specific task (e.g., a teaching pendant) are cumbersome, time consuming and unintuitive. Other methods for teaching via force control require physical manipulation of the robot in its active state, and therefore are restricted to human-safe robots and to demonstrations than can be easily guided in this manner. With VRE, the user may alternate between various perspectives such as egocentric (first person) and exocentric (third person) perspectives to control the robot directly, train or program motions for the robot to make later, or interactively collaborate with the robot during a task execution. Additionally, a user may interact with dynamic 3D graphical user interfaces and interface objects, which allow for additional control, mode changing, data retrieval or monitoring of other systems. These interactive widgets may be placed in a user centric position so as to utilize the user's proprioceptive cues for easier activation or manipulation. General tools for interaction with a robot in a VRE may be available, such as gestures, utilizing spatial locations to represent different system configurations, and tools to manage the control of either a completely simulated robot, or a real world system represented by a simulated virtual proxy.

FIG. 1 depicts an example robot 110 with a wire grasper in a work cell. Robot 110 may be used by, for example, an SME that manufactures wire baskets. A frequent task for this example SME is to transfer bent wire-forms from a commercial CNC wire bender 120 to a welding fixture. To incorporate robot 110 into this task, a user might, for example, (a) teleoperate the robot and maneuver it into an acceptable starting position, (b) record the trajectory required to grab a wire-form from the bender 120 and place it in the fixture, and then (c) monitor the robot 110 during the execution of the task and halt it if there are any errors. This task exemplifies how human-robot interaction modes in a small manufacturing task may cover a range of relationships between the user and robot and how the relationships may change during the execution of the task.

Robot 110 is depicted in FIG. 1 as an industrial robot arm with a wire grasper. Robot 110, however, is not limited to this embodiment. Instead, robot 110 could embody other industrial robot forms, a domestic robot, an articulated welding robot, an autonomous robot, a military robot, a medical robot, or other robot or robotic embodiments.

While the above listed interaction modes may be similar to those involved in larger-scale manufacturing, an SME operator needs to be able to, for example, perform multiple robotic task specifications for different products during an equivalent number of production hours.

A teach pendant may be used to instruct robot 110. However, currently available teach pendants may be limited by a static graphical user interface, a mismatch between control degrees of freedom and those of the robot, and a lack of feedback about the outcome of the program. Improvements to teach pendants may include designing them with human factors considerations, retrofitting the graphical user interface, augmenting the pendant with simulated views of the robot, adding gesture and voice control, and integrating 6-DOF joysticks. Additionally, kinesthetic, lead-through, or force-guided interaction may be used to instruct robots. While these enable intuitive physical programming by demonstration (PbD), kinesthetic guidance is also limited by a relatively high learning curve and the requirement of physical interaction which may not be possible when a robot is interacting with large or dangerous machinery or when the robot is in a remote location. Additional flexibility is still required for small scale, short run change-out tasks performed by SMEs.

An immersive virtual environment (IVE) may provide a flexible human-robot interaction tools required by the dynamic human-robot interaction patterns in tasks like the one described above. Immersive VR may remove the requirement of physical interaction with the robot and replaces physical robot co-presence with virtual robot co-presence in a natural 3D environment. In this context, a user or trainer may share a virtual environment with a visualization of the real robot where he or she can look at, move around, and touch virtual interfaces for robotic interaction.

This means intuitive metaphors for interaction like those used in kinesthetic programming may be preserved. This virtual environment also enables the free-form creation of arbitrary displays and interfaces to support the flexible human-robot interaction requirements of SME tasks.

In an embodiment, an Immersive Virtual Robotic Environment (IVRE) may be provided to train industrial robots for SMEs and other locations. In immersive VR, interaction with industrial systems from the user's viewpoint and control mapping to the robot and task space may be provided.

Augmented reality (AR) and virtual reality (VR) for robotic systems are both meant to make interaction with robots more flexible by combining digital information in a more intuitive manner with a physical system. AR involves projecting virtual information on top of a real physical environment, while VR involves displaying a representation of the physical system in a virtual digital environment.

Augmented reality for tele-robotic control may be performed using, for example, stereoscopic overlays of object models and virtual tools displayed to a user on a 3D screen or with see-through HMDs. Additionally, PbD methods through the use of AR to visualize robot singularities and define compliance parameters may be provided. Further, users may select scene objects and other task locations using augmented reality, which may allow the user to interact with the environment at a higher level via object-based programming rather than, for example, coordinate programming. Marker-less gesture recognition may be provided, where a user's interaction with objects combined with input from an augmented reality display may be used to define robot tasks. Further, tracking a user's head position and orientation in 3D space and interactive virtual menus which the user may operate using gestures may be provided.

Figure 2:
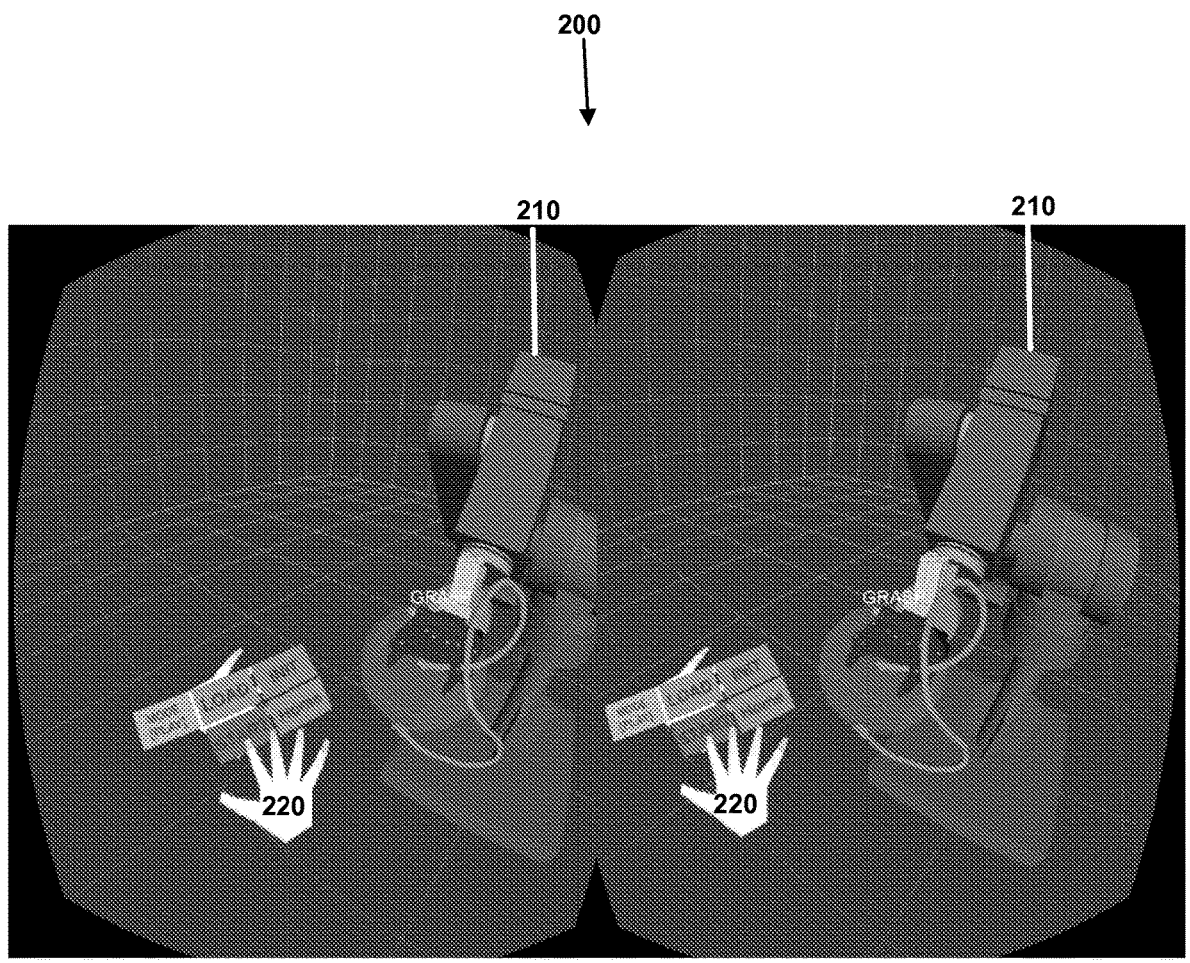
FIG. 2 illustrates an example stereo view of a robot with a programmed trajectory being played back in a virtual environment.

The control mapping between the human operator and the robot may be a critical feature of any VR system. In one embodiment, a system for programming a robot may be provided that uses an egocentric (first person) control mapping to the robot. FIG. 2, for example, shows an example stereo view of a robot with a programmed trajectory being played back in a virtual environment. The system may also include an exocentric (third person), (e.g., over the shoulder) view of the robot and the scene. First person perspective may increase immersion and performance for certain tasks. However, giving users the ability to switch between first and third person perspective at will may be preferable to being fixed to either one. This trade-off between egocentric and exocentric viewpoint and control mappings is of importance to VR-HRI and is provided in the embodiments described herein.

FIG. 2 uses, for example, Oculus Rift™, which is a head-mounted display (HMD) that includes head tracking for virtual environments, similar tools may be used. FIG. 2 depicts virtual environment 200 (e.g., IVRE) containing a hand avatar 220, selectable options, and virtual robot 210.

In an embodiment, an IVRE may provide, for example, the ability to control (e.g., move in real-time or near real time), program (e.g., assign movement patterns for later execution), or collaborate (e.g., interact with autonomous robot behavior) with a robotic system (either remote or locally) using a VRE via, for example, a 3D avatar of the robotic system 210. Further, the ability to, in a VRE, use a combination of first person or third person user perspective to control, program or collaborate with the robot 210. For example, the first person mode may involve moving a robot's end effector around with the appearance to the user that the robot's "hand" is their hand. In this case, the user's avatar would be co-located with the robot's graphical representation in a manner to suggest the two are as one. Third person mode may involve grabbing the robot's effector and moving it around as if the user was manipulation a tool.

Other embodiments may include managing Off-Line Simulated Robots and/or Real-World Robots with a Simulated Proxy. The ability to switch between interaction with an off-line simulation of a real world robotic system and a real-time or delayed proxy representation of that same robot may be provided. For example, a robot 110 in a factory may be trained by first creating a trajectory sequence using a simulated off-line virtual robot 210, and then during the execution of that trajectory on the real world system, interacting with that real world system on-line via the same virtual robot as a proxy.

Additional embodiments may include the following. The ability to use either user commands or programmatic events to switch between off-line simulation and on-line proxy interaction modes. The ability to switch an on-line proxy representation of a robotic system between multiple real world systems of similar configuration in real time. For example, using a single virtual robot to control several identical real world robots by switching which real world robot the virtual proxy represents. The ability to concurrently multiplex a recorded trajectory, task plan or other behavior on an off-line simulated robotic system to multiple real world systems of the same configuration. For example, recording a trajectory on a virtual simulated robot, and then simultaneously playing back that trajectory on five real world robotic systems. The ability to interact with several real world systems via a single on-line proxy representation in a manner where when a real world system is not linked with the proxy, it will behave in a preprogrammed or pre-trained fashion. For example, while five real world robots are performing a task, the user selects one to be linked with the proxy to re-task that robot because of a flaw in the part.

Figure 3:
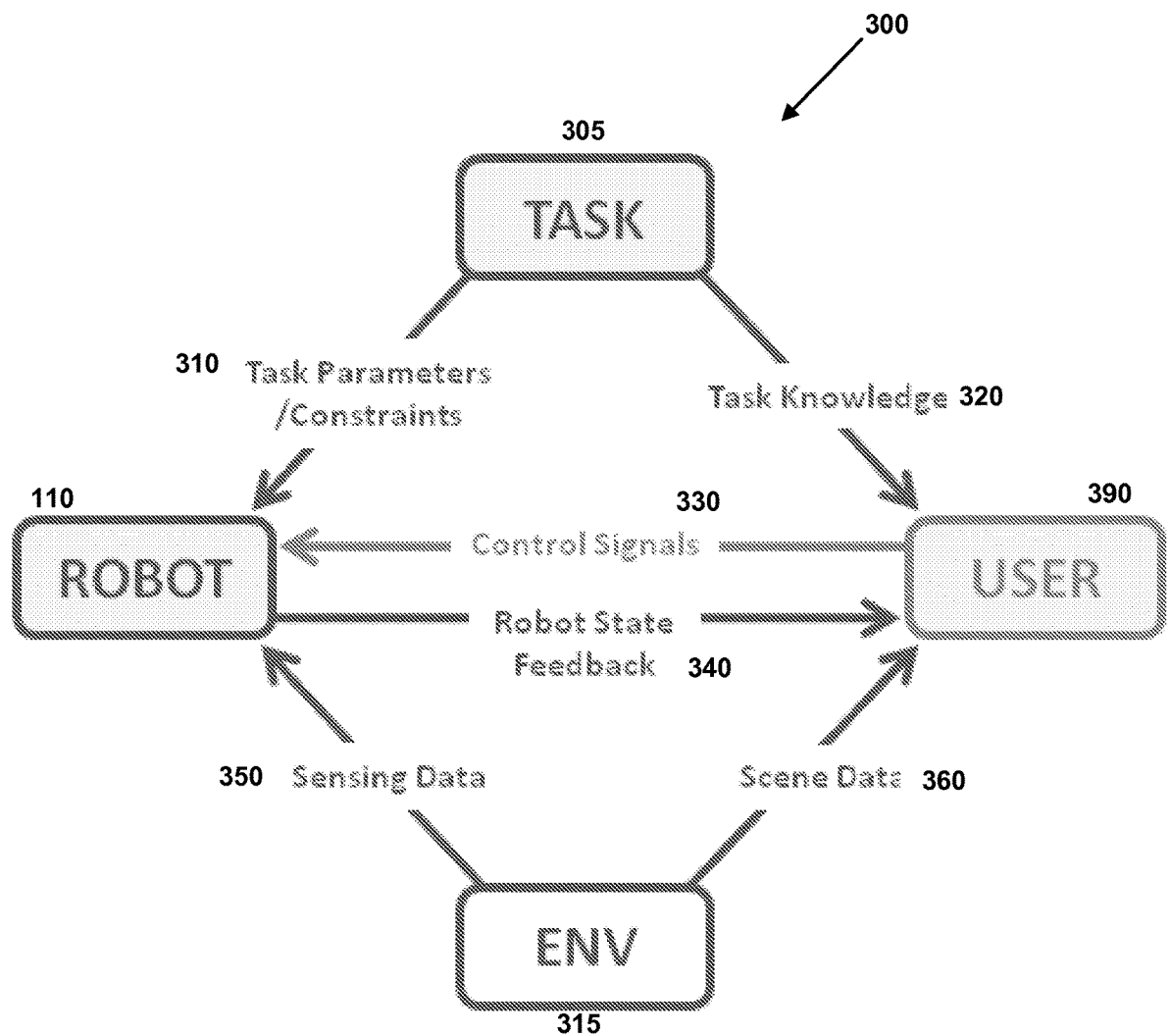
FIG. 3 depicts example information flow between human and robot.

The flow of information in the human-robot collaborative system must be reviewed to design an effective VR interaction paradigm for industrial robots. FIG. 3 depicts example information flow 300 between human 390 and robot 110. Information flow 300 includes the following. In 310, data from task 305 such as task parameters and/or task constraints may be supplied to robot 110 (e.g., task knowledge to the robot). In 320, data from task 305 may be supplied to the user 390 (e.g., task knowledge to the user). In 330, user 390 may supply data in the form of control signals to robot 110 (e.g., control information from the user to robot). In 340, robot 110 may supply data to user 390 (e.g., information about the robot's state to the user). In 350, environment 315 may supply sensing data to robot 110 (e.g., environment knowledge to the robot). In 360, environment 315 may supply scene data to user 390 (e.g., scene knowledge about the environment to the user).

The relationship between user 390 and the robot 110 for a given task (e.g., the role of the user) may determine the required frequency, fidelity and latency of information flow for a given task. For example, user 390 teleoperating robot 110 requires low-latency, high-frequency, high-degree-of-freedom (DOF) control, as well as real-time feedback from the robot about its state. However, when programming robot 110, user 390 additionally must supply information about workspace and velocity constraints and temporal logic about the task, as well as invoke discrete commands such as enabling/disabling motion recordings, for example. In 330, for example, user 390 may only monitor robot 110 and therefore may require much less frequent control input and robot state feedback. In one embodiment, a human-robot system (e.g., 300) has interface primitives with corresponding interaction metaphors that support all of the information flows (e.g., 310-360), as well as the ability to switch the modality of these interfaces as user roles change.

Therefore, an embodiment of the IVRE meets the following three requirements:

Enable real-time monitoring and interaction with an industrial robot in a manner similar to kinesthetic guidance. This provides an intuitive modality for programming from demonstration as well as general teleoperation.

Provide flexibility for different user roles in the human-robot system. The IVRE supports a wide range of interface primitives that enable the knowledge transfer channels of FIG. 3.

Embed information and displays into the virtual environment. Enable as much interaction as possible through the head-mounted display (e.g., Oculus Rift™) and motion sensors (e.g., Razer Hydra™), eliminating the need for external peripherals such as a mouse or keyboard.

What follows is a description of basic interaction metaphors with the virtual environment and a discussion of the different interface primitives that constitute the IVRE interaction paradigm In one embodiment, the virtual environment may take the form of any 3D representation of an indoor or outdoor environment (e.g., a 10×10 meter room) in which user has a stereoscopic viewpoint of the virtual space, and in which that user 390 may virtually move around. This environment may be generated by placing either laser scanned 3D assets from a real world scene, or artist created assets approximating a real world scene, into a 3D environment generated by OpenGL or another graphics library. This freedom of movement allows one or more users user 390 to virtually move closer or further to task elements depending on the perceptual and motor requirements of the task. User 390 may look in any direction using, for example, head tracking in the head-mounted display (e.g., Oculus Rift™) User movement in the virtual environment may be accomplished by, for example, joystick input (e.g., Razer Hydra™ wands). The position and orientation of the user's viewpoint in the virtual environment follow their head motion, motion commanded from a joystick, or their physical motion, as determined by a body tracking device or sensors. In one embodiment, the user may be represented by right and left hand avatars. The hand avatars may follow the position of the users hands via motion sensors held by user 390 (e.g., Razer wands), and may be calibrated to user's head so they appear proprioceptively aligned. In another embodiment, the user may be represented by a full body avatar that represents the position and orientation of the user's own body and joints. This can be supplied by a full body tracking system such as the Kinect or Vicon tracking systems. The user can additionally switch their viewpoint arbitrarily by any other interface, causing them to jump or "teleport" in the virtual environment. The user may also change the environment at will, for instance to rapidly switch between a virtual representation of two separate factory floors. Furthermore, any user in the shared environment can interact with any virtual entity.

Robot 110 may be represented by virtual robot 210, a 3D model or scan of an existing real robot. This virtual representation may either show a simulation (e.g., off-line) of the robot generated from the kinematics of the real robot, or the actual state of the robot (e.g., on-line) by updating the virtual robot's position, orientation or joint values to match the real robot. The simulation could use the same kinematic and dynamic model of the robot, but rather than receiving feedback from the actual robot about its joint positions and forces, the simulation could use the dynamic model of the robot and estimations of joint position based on current velocity. User 390 may interact with the real world robot 110 via the virtual robot 210 (and in effect moving the real robot). Such interaction would could be performed by generating a Cartesian pose for the robot end effector to move to (this pose could be generated by user input, buy a saved trajectory, or other interfaces) and commanding the simulation controller to generate an appropriate set of joint angles to determine the resulting joint pose of the robot. In order to control the real robot by proxy, either the same Cartesian endpoint pose could be commanded to the real robot (which would be resolved by the real robot controller), or the joint positions of the virtual robot could be replicated on the real robot, using PID control to command the real robot joints to the desired angles. The user may also visualize the real world task space around robot 110 using either a point cloud of the scene from an RGBD camera, or via a stereo view from a robot-attached stereo camera, for example. The data generated from the camera or depth camera is created either as a sprite in the 3D environment (in the case of 2D camera data) or as a cloud of 3D point objects (in the case of depth or 3D sensor data). In one embodiment, interactions with virtual entities (tools, GUIs, virtual robots) take place via selection by proximity. For example, when the user places his or her hand avatar 220 near an interactive entity, the distance will be calculated between the users hand avatar and the entity. Should that distance be below some threshold, (e.g. such as the radius of the sphere enclosing the entity) that entity will be "selected", which is displayed as a change in color or transparency, change in entity shape, or configuration. Selection can also occur via or via "picking" (i.e. GL pick) where a entity is considered selected when the user's avatar occludes the entity from the visual perspective of the user. Selected items, for example, can then be "grabbed" or "pressed" by activating a button on the controller (e.g., Hydra Wand™). In another embodiment, entities can be selected by a ray emanating from the user's hand avatar. When this ray intersects the entity, that entity is now "selected". Additionally, an entity can be selected by a rigid body collision of the user's hand avatar and the entity, assuming the environment supports collision detection.

Figure 4:
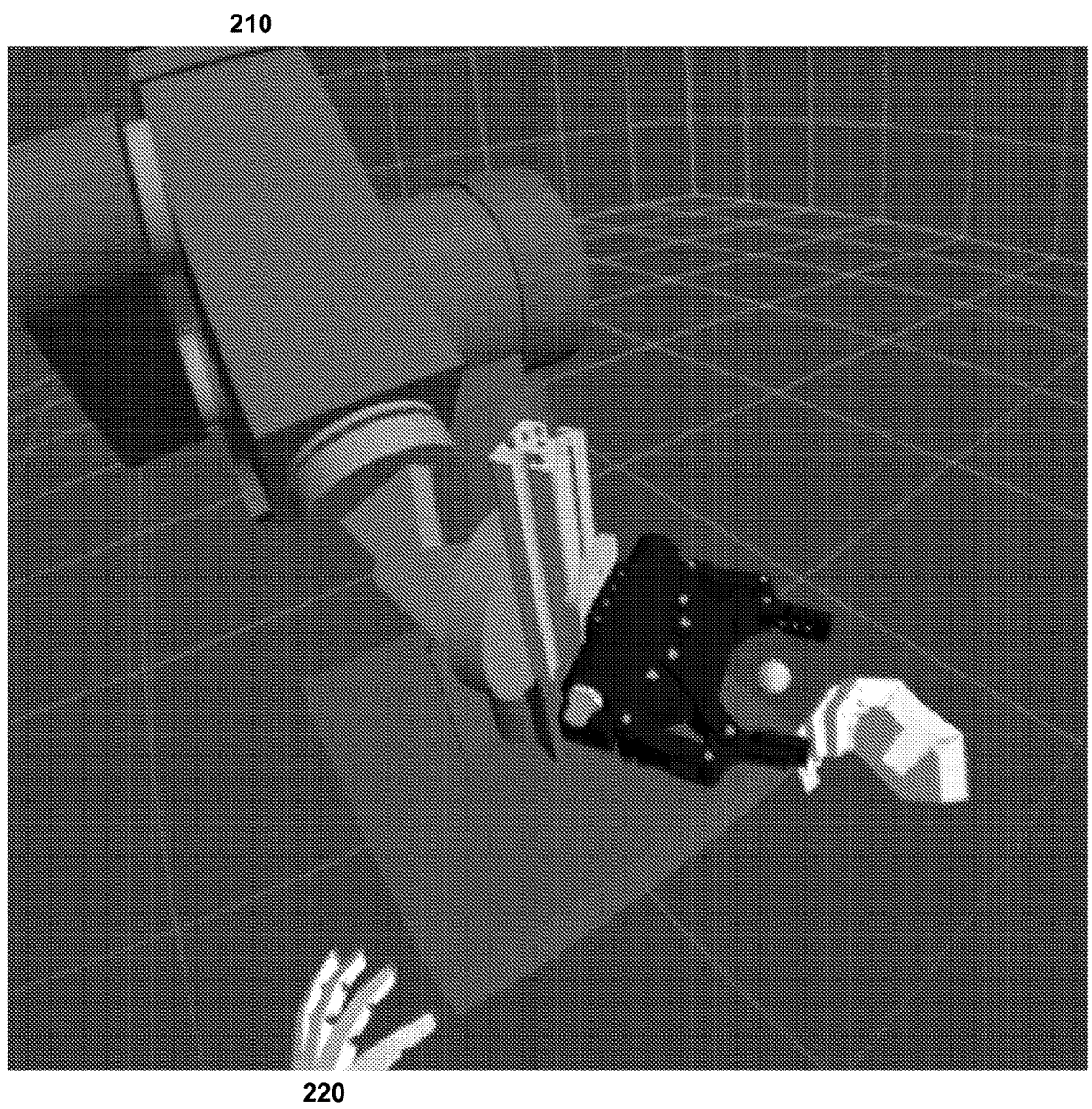
FIG. 4 depicts example exocentric view for interacting with a robot.
Figure 5:
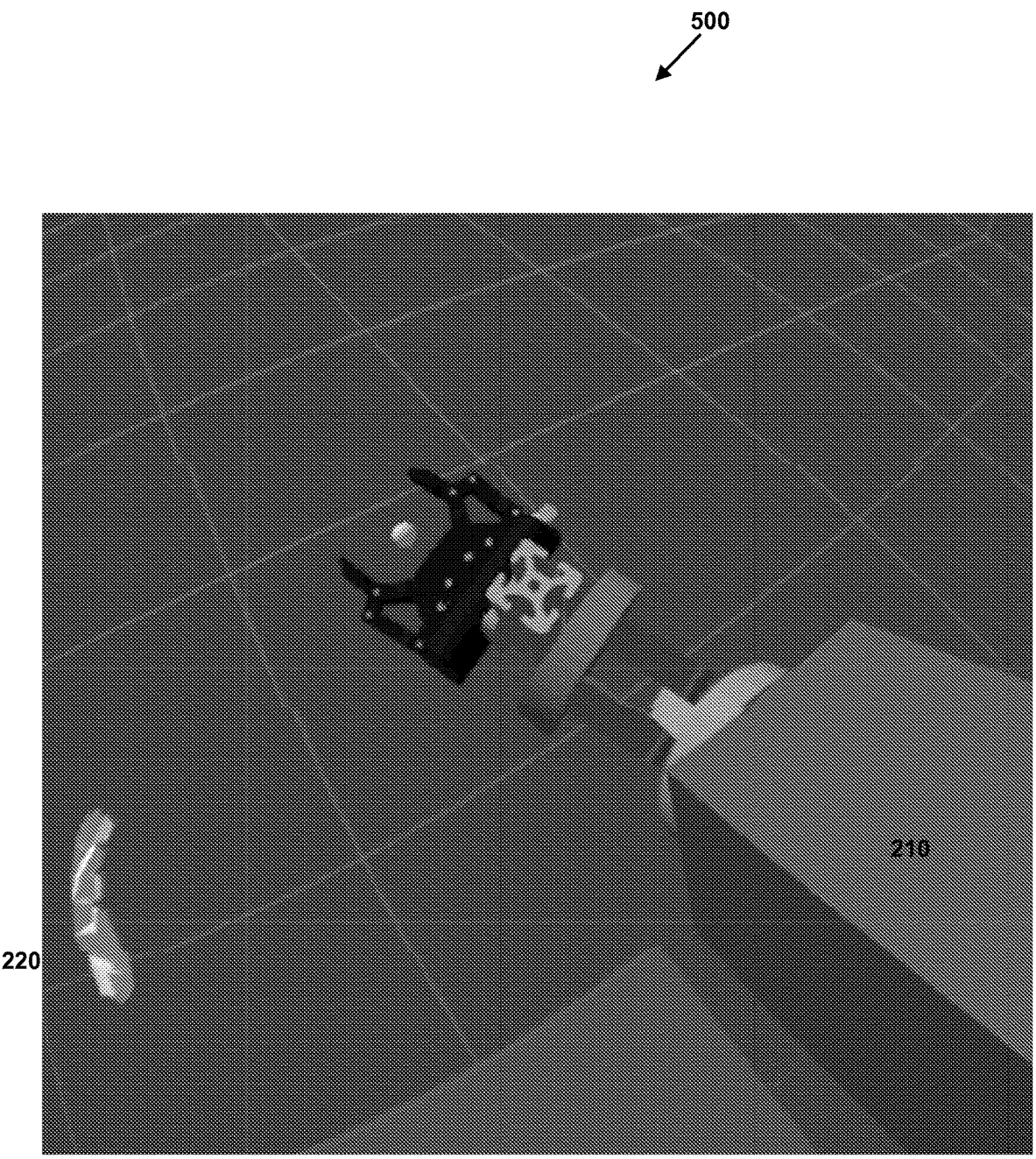
FIG. 5 depicts example egocentric view for interacting with a robot.

When interacting with virtual robot 210, user 390 can not only interact from an exocentric (third person) perspective but also from an egocentric or first person perspective. FIG. 4 depicts example exocentric view for interacting with virtual robot 210. FIG. 5 depicts example egocentric view for interacting with virtual robot 210. The egocentric perspective allows user 390 to place themselves "inside" virtual robot 210 and operate it from the robot's point of view. This is enabled by placing the user's viewpoint in such a position that the visible virtual geometry of the robot overlaps with the spatial region that would normally correspond to the user's arm. Instead of seeing their own arm, they see the robot's arm, allowing the user to make natural movements with his or her own arm and see the robot arm behaving in the same way. This allows the user to have more of a proprioceptive grounding in the control of virtual robot 210. Conversely, the exocentric perspective allows user 390 to use his or her visual perception of the scene, for example leaning in to examine fine details of the scene closely to make precise adjustments. The user's viewpoint is fixed to be in alignment with virtual robot 210 for egocentric and it is mobile for exocentric perspectives.

Combining conflicting viewpoints and control mappings, (e.g., controlling the robot exocentrically from an egocentric viewpoint (or vice versa)) requires the motion of the user's virtual hand and the robot's end effector to be decoupled, which breaks the interaction paradigm of kinesthetic guidance. However, specifically having an exocentric viewpoint with an egocentric control mapping can be useful when the task scale is larger than the human's workspace.

In a human-collaborative system, there are several requirements for presenting information to the user in various forms. These include (see FIG. 3, 300), for example, task information, robot state information, and environment information. As discussed above, the user's visualization of the physical task space may be achieved by a 3D point cloud rendered in the virtual environment. Information about the real-world robot 110 may be visualized primarily by the robot proxy (e.g., virtual robot 210), where user 390 may view virtual robot 210 and thereby inspect the physical configuration of robot 110.

Other information such as alphanumerical information about robot 110, or information about task 305 may be displayed by virtual information displays VIDs. VIDs can be created programmatically by the system or can be spawned on demand by the user, using any input interface. VIDs are created as 2D or 3D sprites in the virtual environment that are textured with a pre-generated texture. This texture can display text, static images, video streams or 2D visual information. VIDs may provide the ability to use 3D information displays to monitor robot state, textual information, video feeds or other information from one or multiple robotic systems. VIDs may be moved around by the user (or programmatically), or attached to arbitrary transformation frames in the environment. This is achieved by enforcing that the pose of the VID in the 3D environment to follow the positional frames of the user or other entities in the environment through a static geometric transform. In this way VIDs can be "attached" to the user or robot, to follow his or her position. The VID may be locked to a robotic avatar, by creating a static geometric transformation between some reference frame on the robot and the VID. An example could be joint information displayed on the joint of the robot, using a static transformation between the VID and the shoulder joint frame of the robot. The display may present joint angle information and be locked to the robot's shoulder joint, so that it always shows the joint angle at the position of the joint, regardless of the robot's motion.

In an embodiment, the VID may be locked to (or relative to) the user or to user's avatar. For example a textual display that always hovers near (or is always visible by) the user no matter where they move in the virtual environment, by creating a static transformation between the user's torso frame and the VID. Or, keeping a clock VID in the same position in the user's view, relative to their head frame, so the clock is always visible no matter the orientation of the user's view. Or, lock the clock VID to the user's forearm frame, so the user may look down at their arm (or hold up their arm) to see the time, regardless of their body position. An example VID may be seen in FIG. 2.

Mixed reality user interfaces (UIs) in a VRE may also be provided. For example, the ability to use 3D interactive graphical user interfaces (widgets) in the VRE, which may be adjusted by the user (moved, rescaled). These widgets may be textured or shaded in any aesthetic or artistic manner. For example, a floating panel of buttons that may be "pressed" by the user, moved in the environment, and/or resized. The ability to "dock" 3D widgets with the user's own 3D avatar, so as to enable interaction via the user's proprioceptive cues. For example, the button panel may be locked to stay at the user's elbow by temporarily enforcing a transform between the panel and the users elbow frame, and in that manner, the user need only use proprioceptive cues to touch their elbow (in a natural manner) to activate the widget. The user could then undock or dismiss the widget when desired. The ability to lock the position of 3D widgets with respect to either the user or another avatar in the scene may also be provided. The button panel may be locked at a set distance from the user's torso, so that it moves relative to the user and always stays in reach as the user moves within the VRE. The ability to lock the position of a 3D widget with respect to another avatar (or moving 3D representation) in the scene. In another example, locking the button widget to the side of the robot so it remains on the robot's side regardless of robot avatar motion may also be provided. Mixed reality interfaces can also include visual cues that take the form of color or shape changes in existing geometry or textures. These cues can be used to provide force information for the robot, proximity alerts to hazardous regions, signify robot motor temperatures, etc.

Figure 6:
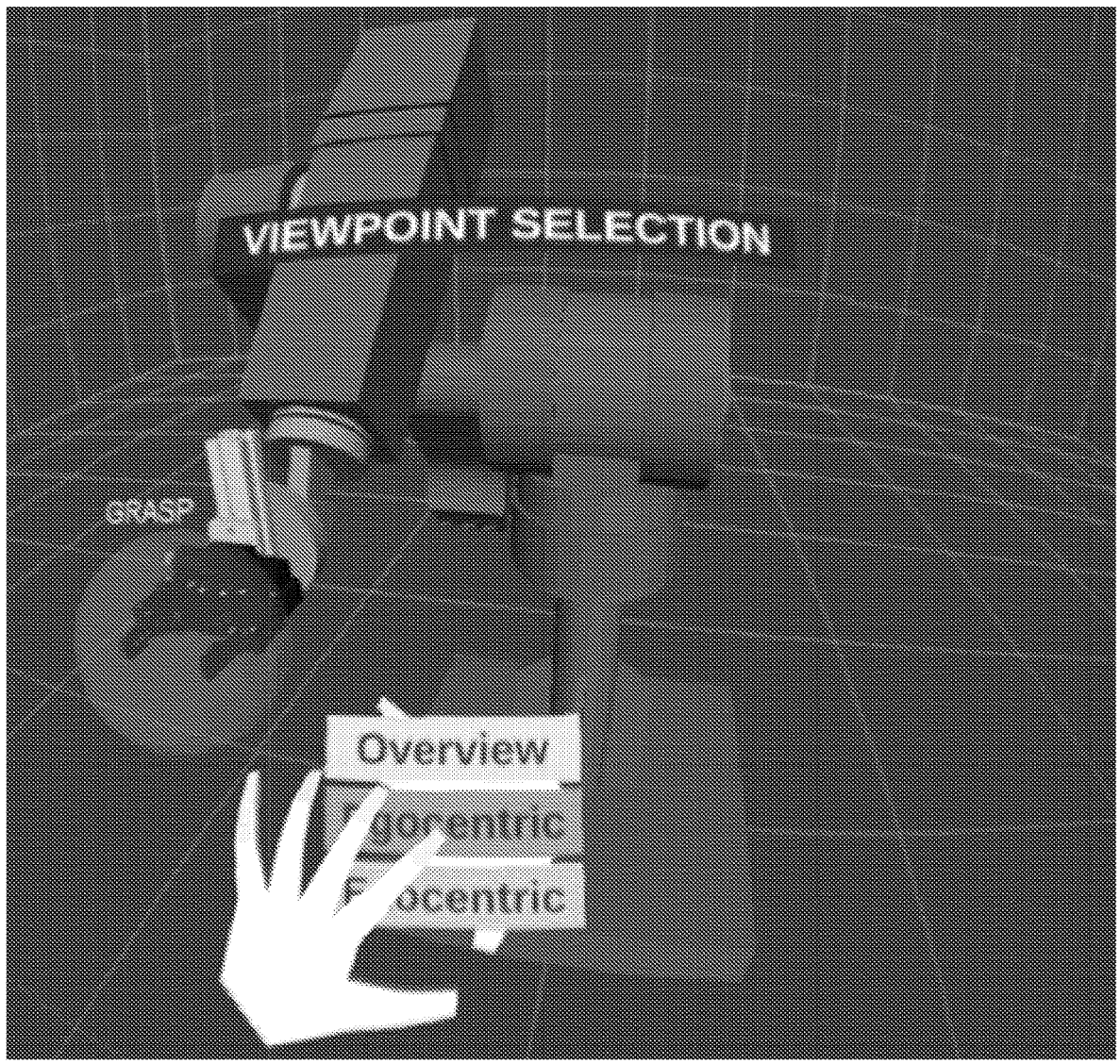
FIG. 6 shows an example overlay virtual information display.

VIDs may also be assigned in an overlay mode, where they are rendered on top of all other scene entities, to provide an experience similar to augmented reality overlays. FIG. 6 shows an example overlay virtual information display VIEWPOINT SELECTION that is showing textual information about the state of the menu. FIG. 6 displays a view of the viewpoint selection virtual user interfaces (VUI), including buttons for selecting egocentric, exocentric and overview (e.g., a few meters from the robot) viewpoints. Also shown is the VIEWPOINT SELECTION overlay VID which follows the user's gaze direction and remains on top of other scene geometry. Because we want to mitigate any refocusing of the user's eyes, which can cause fatigue, we want the interface geometry to be in the same visual plane as the geometry over which the interface is displayed. Since geometry the user is interacting with is typically near infinity, the solution is to make the interface much larger and further away than the geometry. By then rendering the interface after the geometry, the interface appears on top, and properly sized because of the distance away from the user.

To address the requirement of discrete control signals from the user to the robot (e.g., 330 in FIG. 3), an embodiment IVRE may support virtual user interfaces (VUIs). Similar to information displays, virtual user interfaces are 3D graphical objects that can provide the functionality of buttons, drop down or radial menus, or toggles. Interaction with interfaces may also follow the proximity selection mentioned above. These are implemented as textural regions that each map to a specific command. For instance, a VUI might consist of a panel of three buttons. Each button has its own interaction region, where it is considered "selected", that can be activated by proximity to the user's avatar, via a ray from the user's hand intersecting the region, or via "picking" (i.e. GL pick) where the a region is considered selected when the user's avatar occludes the region from the visual perspective of the user. Also similar to VIDs, VUIs can be attached with respect to virtual frames and entities in the environment.

Figure 7:
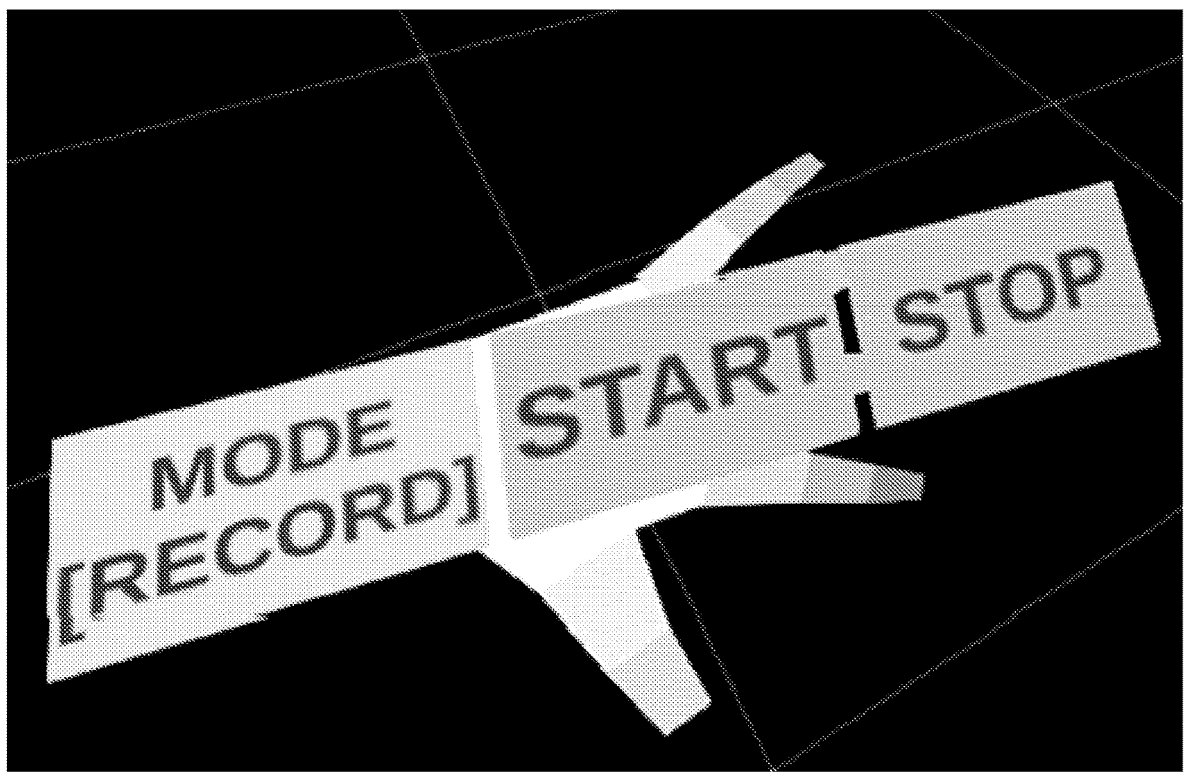
FIG. 7 depicts an example virtual user interface showing a trajectory recording menu attached to a virtual user's hand.

FIGS. 7-10 depict example virtual user interfaces. Following the design of VIDs, VUIs can be attached to frames such as the virtual robot 210 or user. FIG. 7 depicts an example virtual user interface showing a trajectory recording menu attached to a virtual user's hand. The recording menu VUI may by attached and follow the virtual user's hand or avatar.

Figure 8:
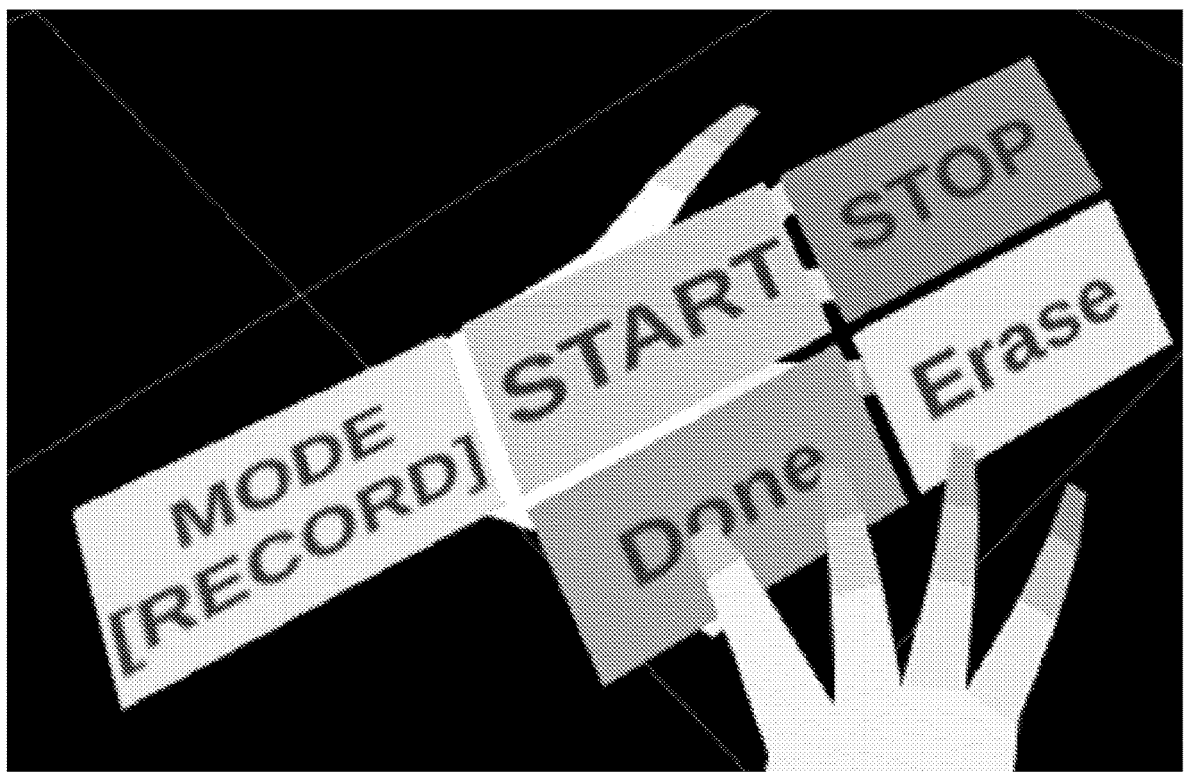
FIG. 8 depicts an example virtual user interface showing the recording menu with additional contextual options.

FIG. 8 depicts an example virtual user interface showing the recording menu with additional contextual options. For example, once the stop button is pressed, additional options may be displayed.

Figure 9:
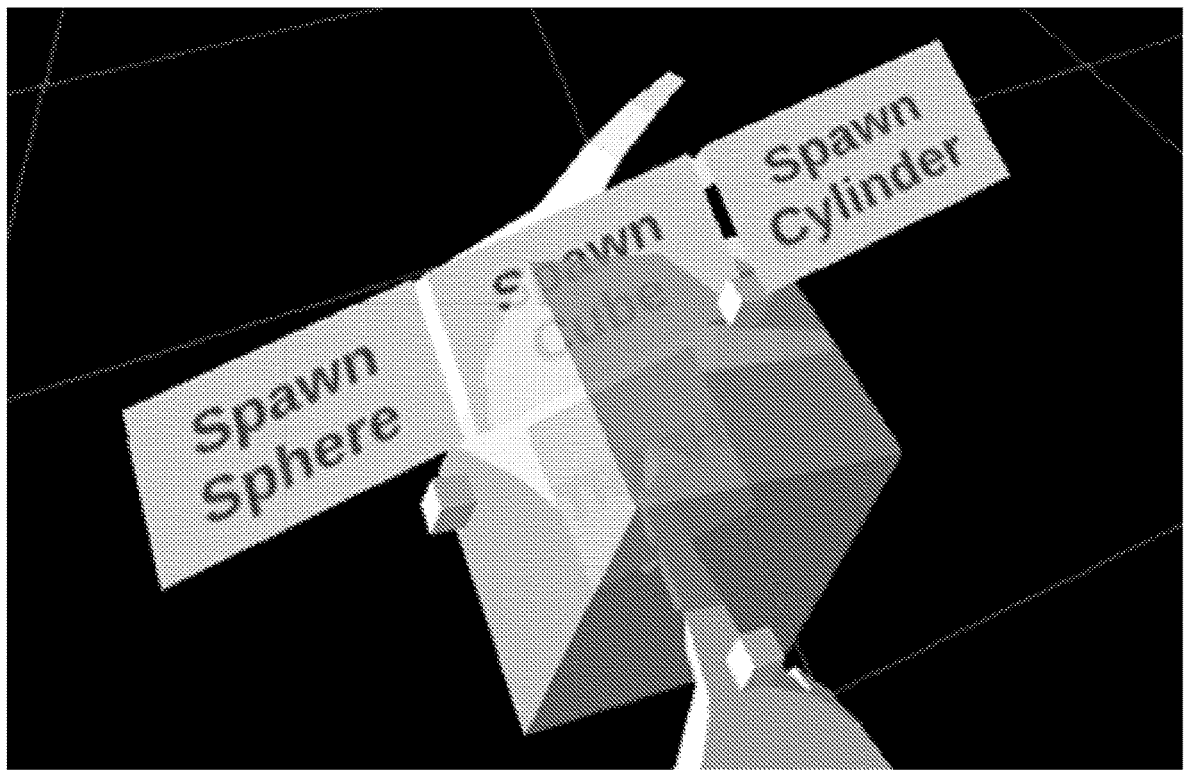
FIG. 9 depicts an example virtual user interface showing a helper object.

FIG. 9 depicts an example virtual user interface showing a helper object. For example, helper objects such as a sphere, cube, or cylinder may be created. The helper objects may be deleted by dragging the object to the trash, as shown in FIG. 9. Accordingly, more complex behavior may include moving an object to or near a VUI to perform an action (e.g., delete object).

Figure 10:
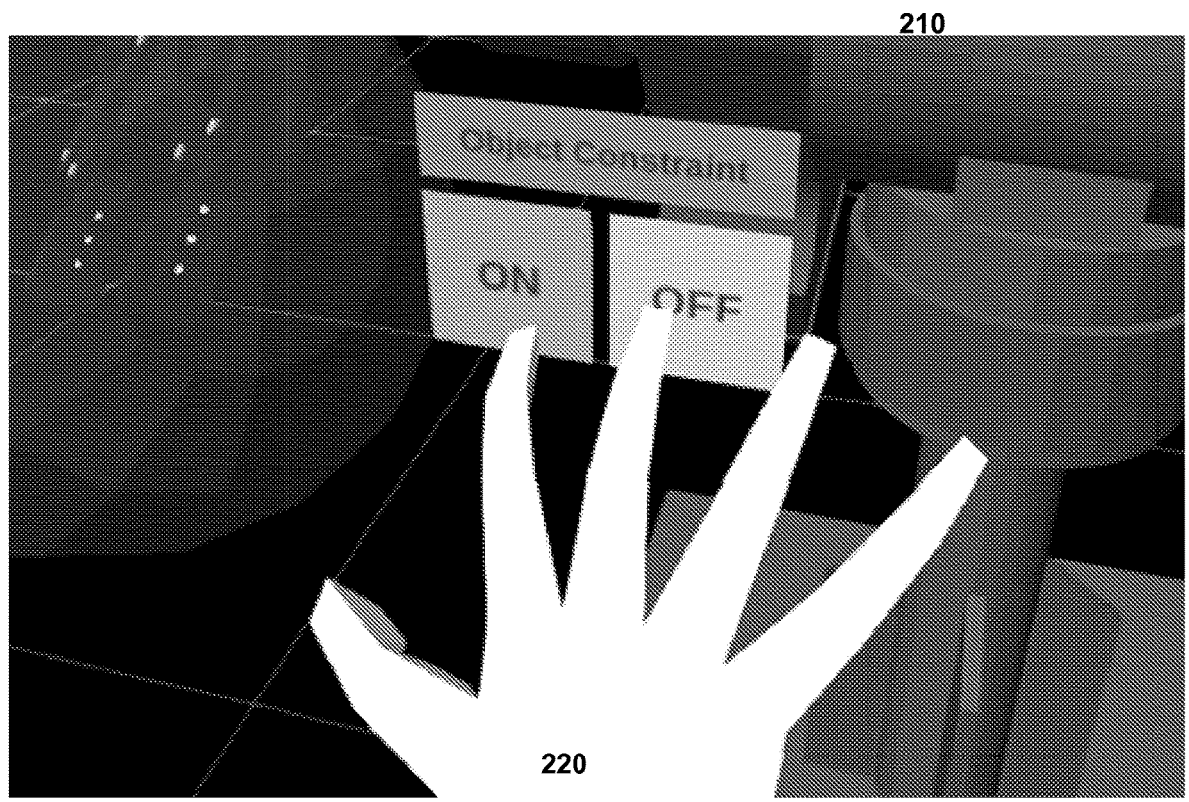
FIG. 10 depicts an example virtual user interface attached to a virtual robot.

FIG. 10 depicts an example virtual user interface attached to a virtual robot. In FIG. 10, for example, an attached user interface may follow the position of the end effector, as shown with the motion constraint menu in FIG. 10.

For interfaces attached to the user, such as in FIG. 7 where the VUI menu follows the position and orientation of the users hand avatar, the user can use proprioceptive cues for activating menus, or make intuitive gestures to enact VUI functionality, such as a "look at your watch" gesture to show or hide a VUI menu.

In another embodiment, to address the transfer of task knowledge (such as motion trajectories) to robot 110 via the user 390 (e.g., 340 in FIG. 3), as well as continuous control signals to robot 110 (as during teleoperation), IVRE supports simulated kinesthetic control of robot 110 via the proxy robot 210. To move robot 110, the user places his or her virtual hand 220 within a specific radius of interaction around the robot's 210 end effector (marked by a translucent sphere). Once inside, a button press may enable robot's 210 end effector to follow the Cartesian position and orientation of the user's 390 hand. This provides a similar interaction modality as "grabbing on" to the real robot 110. The user can also move the robot using input from a VUI, or from gestures made in the virtual environment, such as a "pushing away" gesture that causes the robot to retreat from the user. This metaphor has limitations from the standpoint of scaling as well as human workspace size (limited by the user's arm reach length). If user 390 needs to interact with a virtual object that is farther than they can reach, the only option they have is to move towards the object, but they might want to keep his or her viewpoint while interacting with distant items. If the user is interacting with the aforementioned projected ray selection method, this interaction method can be used to interact with a distant virtual object. The user can also spawn a local copy of a virtual object that is within interaction reach, which causes the copied object to perform the same motions or actions as the local object.

Figure 11:
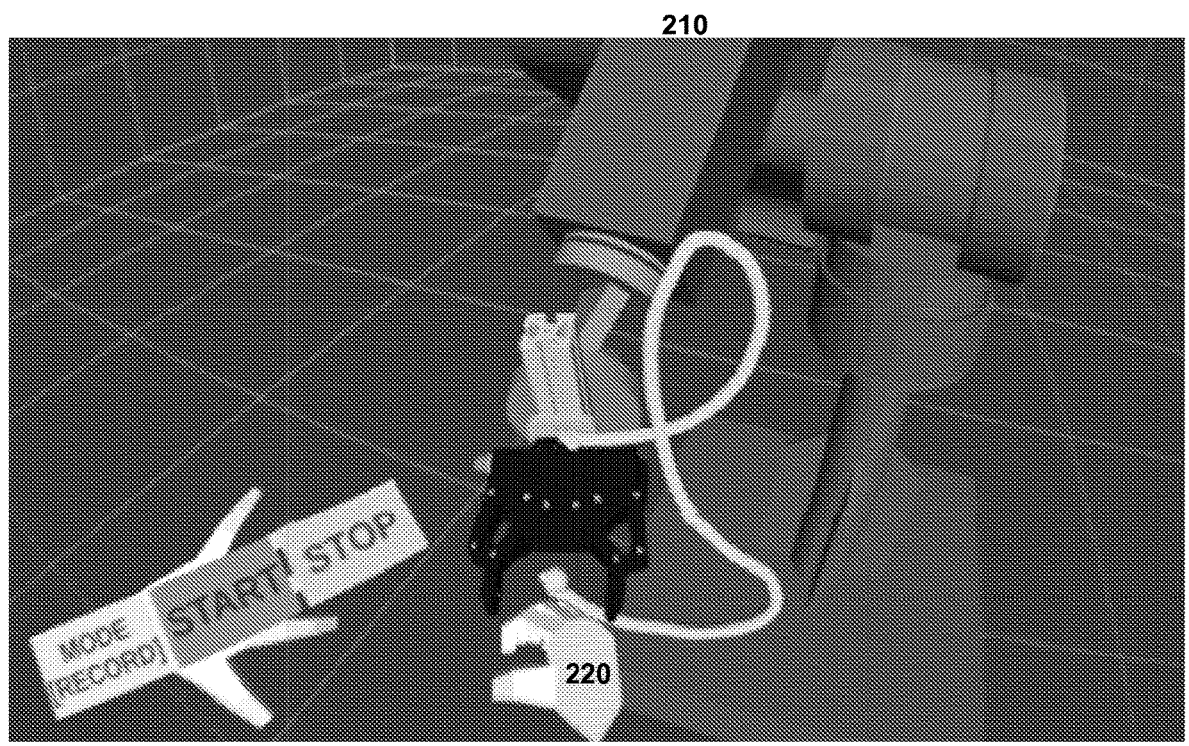
FIG. 11 depicts an example virtual lead-through programming.
Figure 12:
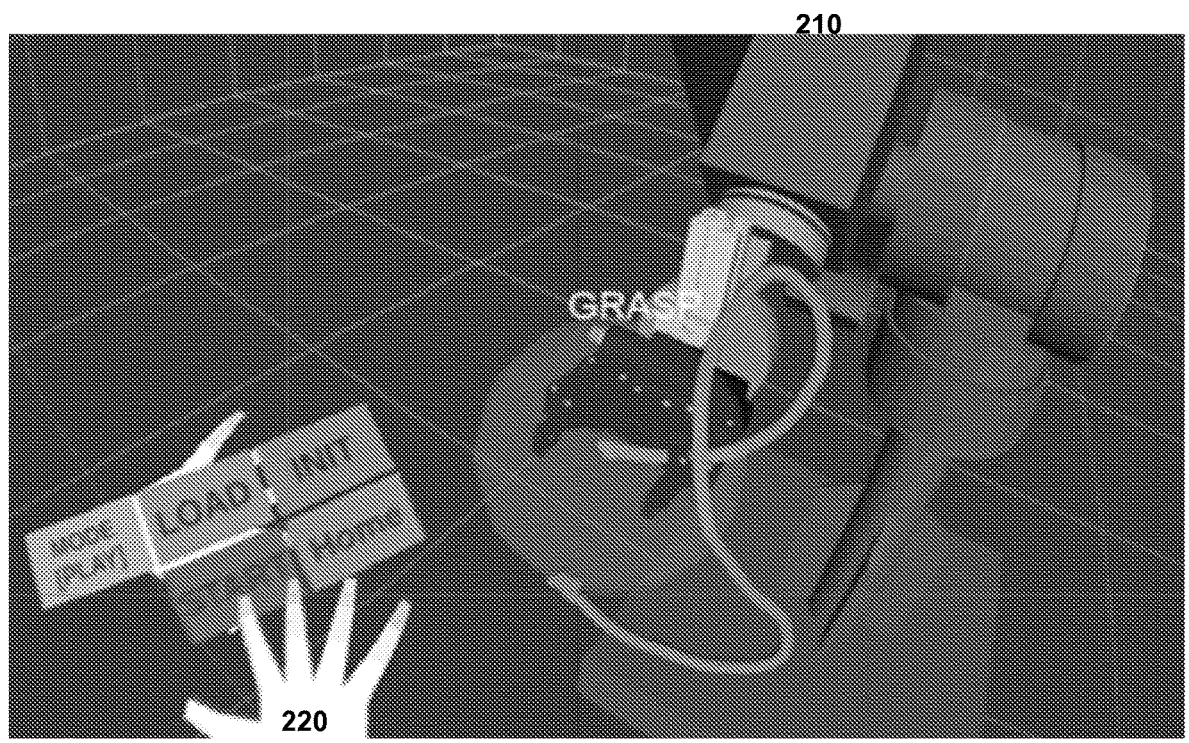
FIG. 12 depicts replaying a demonstrated trajectory on a virtual robot using a separate interface to load and playback motion trajectories.

To record motion trajectories, for example, user 390 may enable a virtual user interface which provides buttons to enable and disable motion recording, save or discard recordings. FIG. 11, shows an example virtual lead-through programming. In FIG. 11, for example, a trajectory may be demonstrated with lead through programming using the robot proxy 210. FIG. 12 depicts replaying the demonstrated trajectory on the proxy robot 210 using a separate interface to load and playback motion trajectories. By replaying, the robot 210 motion may be validated before commanding the trajectory to the real robot 110. The trajectory can be visualized by a spline or a series of waypoints, or by a sequence of visualizations of the virtual robot itself in different configurations. The user can also supply a trajectory to the robot by demonstrating a trajectory themselves, using their hand avatars and virtual objects. For instance, the user could grab a drill virtual object, and demonstrate a drilling motion, which the robot could replay.

Training virtual robot 210 in a virtual environment has the added benefit that the robot proxy can be moved and trained off-line, with respect to live data from the scene, and that trained action can be replayed off-line as well. This means user 390 can carefully examine the action and its consequences before deciding to cancel, redo, improve or deploy it on the real robot 110.

In one embodiment, the IVRE may allow for the creation of interactive virtual helper objects (VHOs), which can take the form of deformable geometric primitives. These interactive helper objects may have several uses such as motion constraint, representing task information, and representing environment information, for example.

Figure 13:
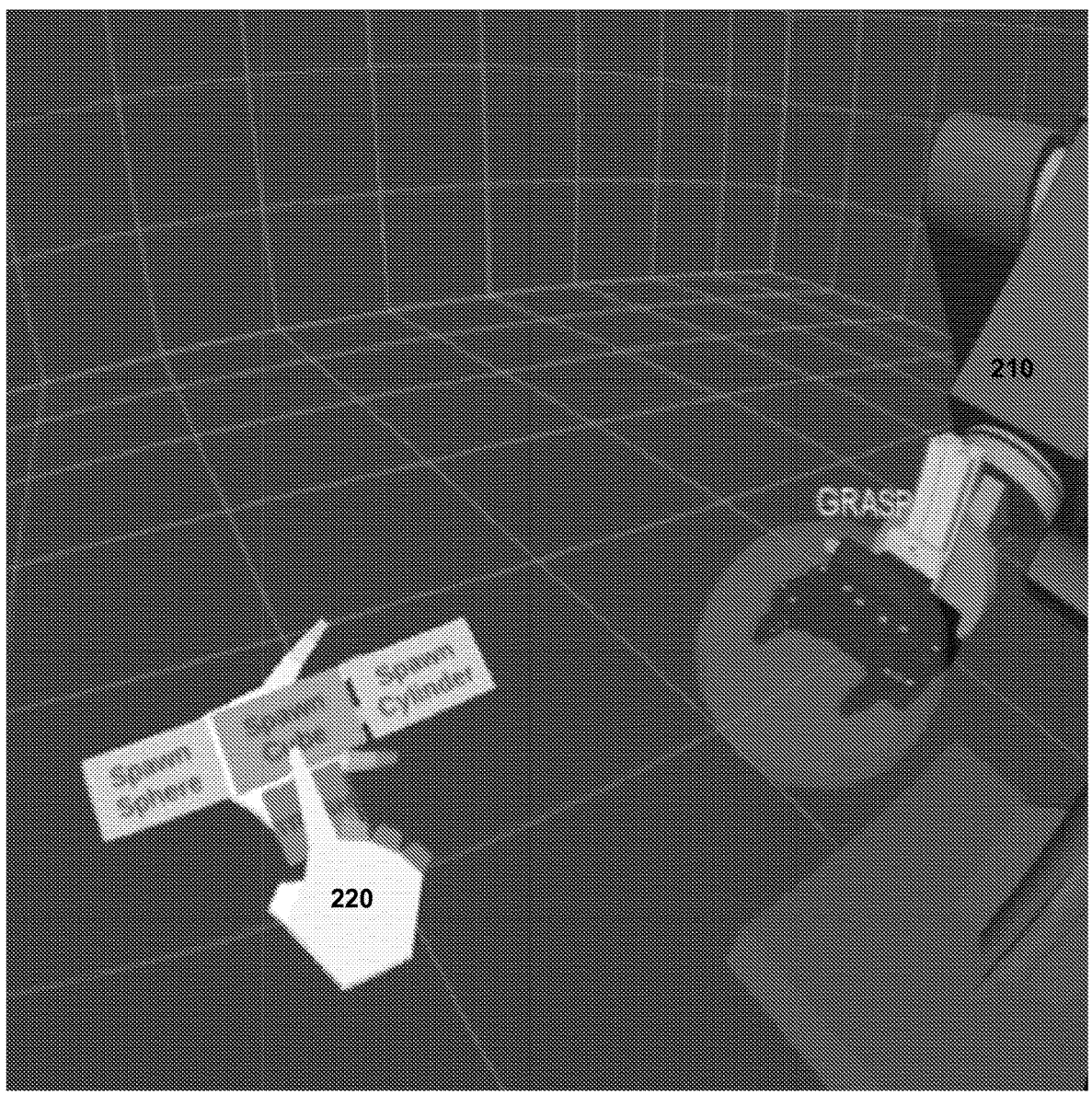
FIG. 13 displays a virtual user interface menu for managing helper objects.
Figure 14:
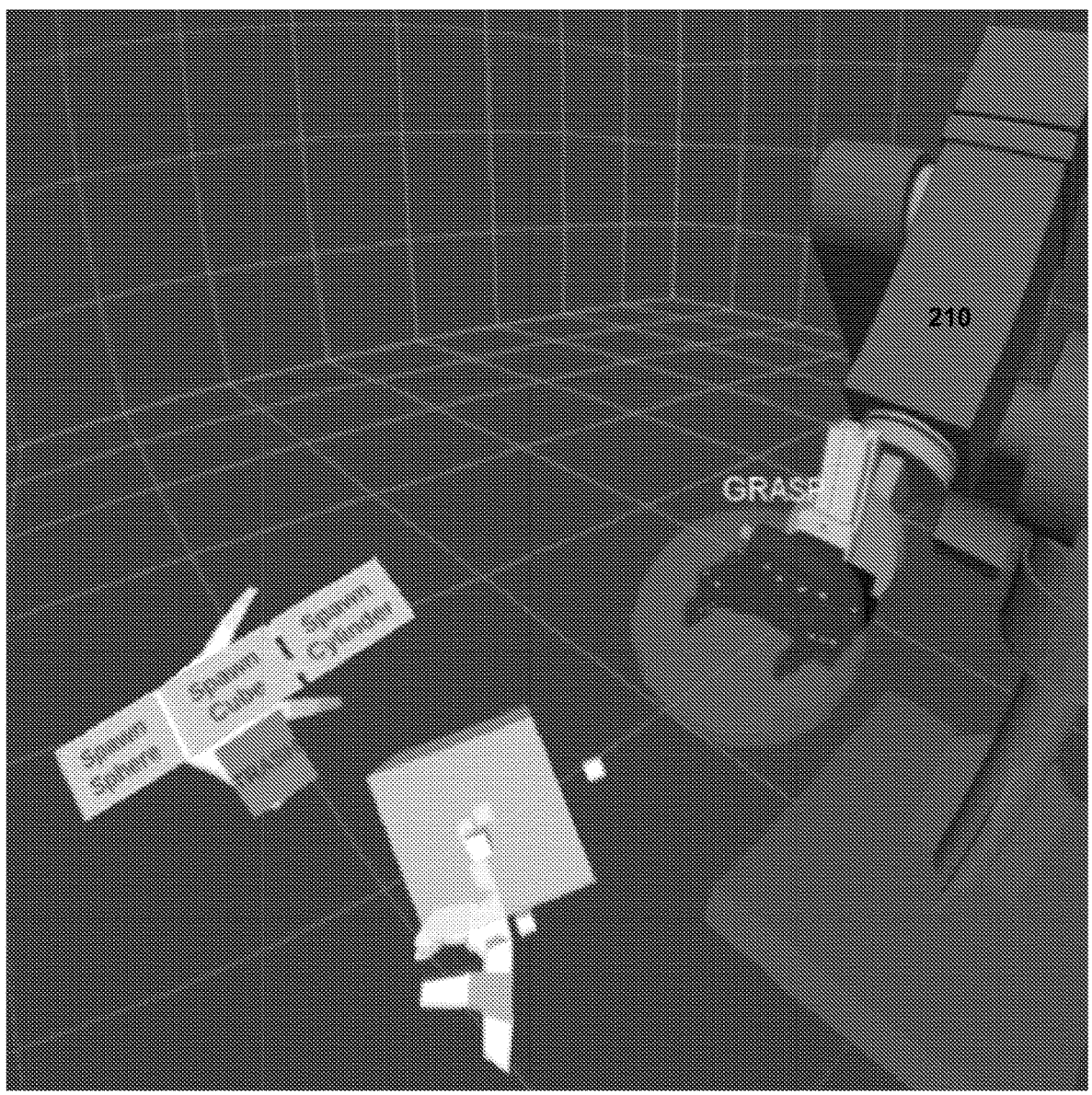
FIG. 14 depicts creating a cube helper object.

FIG. 13 displays a VUI menu for managing helper objects. For example, to spawn a sphere, cube or cylinder, or the option to drag a created object to the trash. The ability to create, spawn or define manipulatable geometric primitives (cubes, spheres, rectangular prisms, etc.) or detailed 3D mesh objects as overlays of real time sensing data (such as a 3D point cloud) to define geometric regions for robotic interaction in the real world may be provided. For example, given a point cloud representing some real world geometry is available in the VRE (e.g., as a laser scan of a kitchen table with a ball on it), the user can "draw" a sphere around the region of the point cloud that represents the ball, to enable the robot to pick up the ball FIG. 14 depicts creating a cube helper object from the VUI menu. In addition to geometric primitives, VHO may be 3D meshes such as tools or other shapes.

Figure 15:
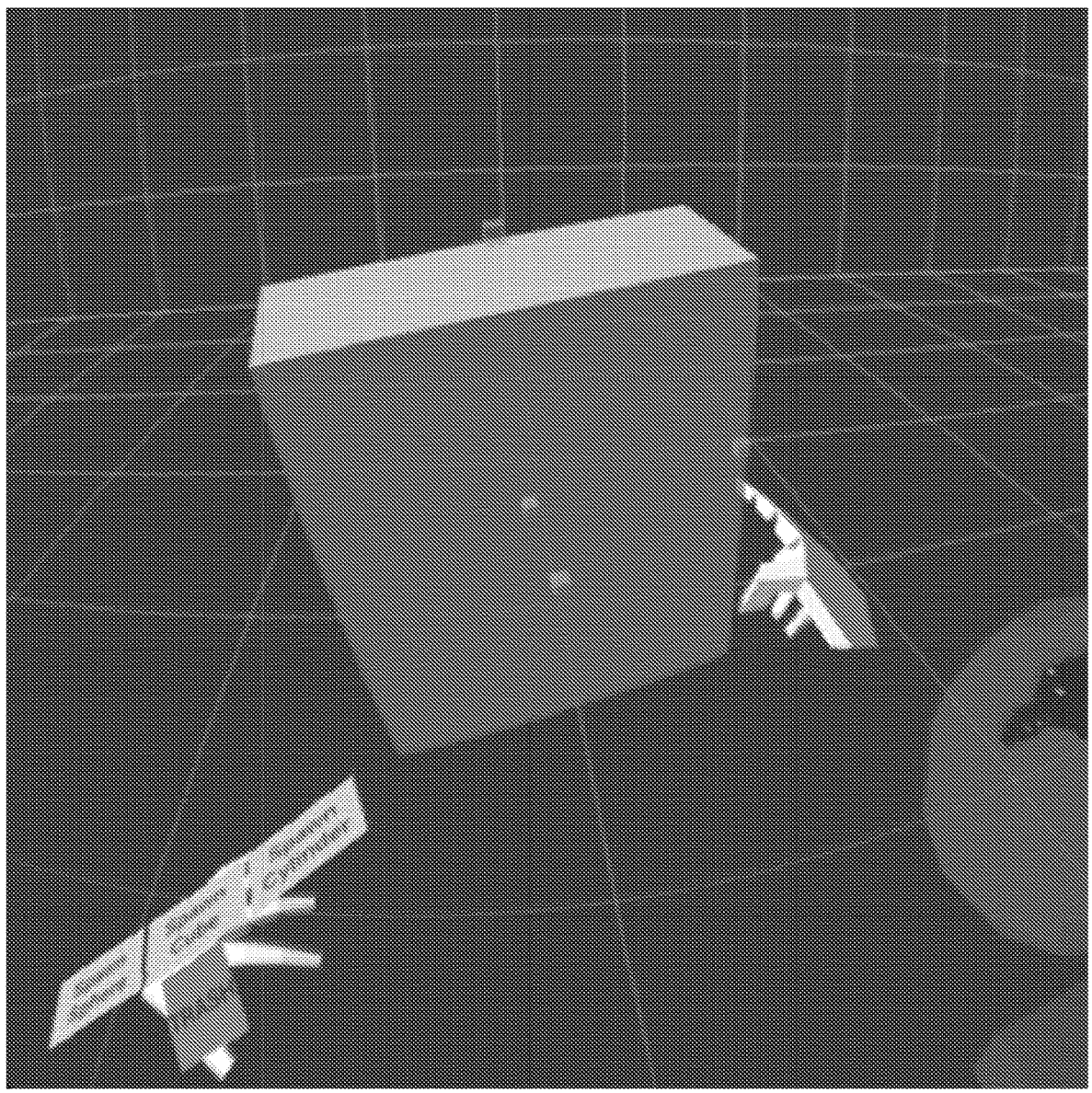
FIG. 15 depicts using handles to resize a helper object.

FIG. 15 depicts using handles to resize the helper object into a flat rectangular shape, for example.

Figure 16:
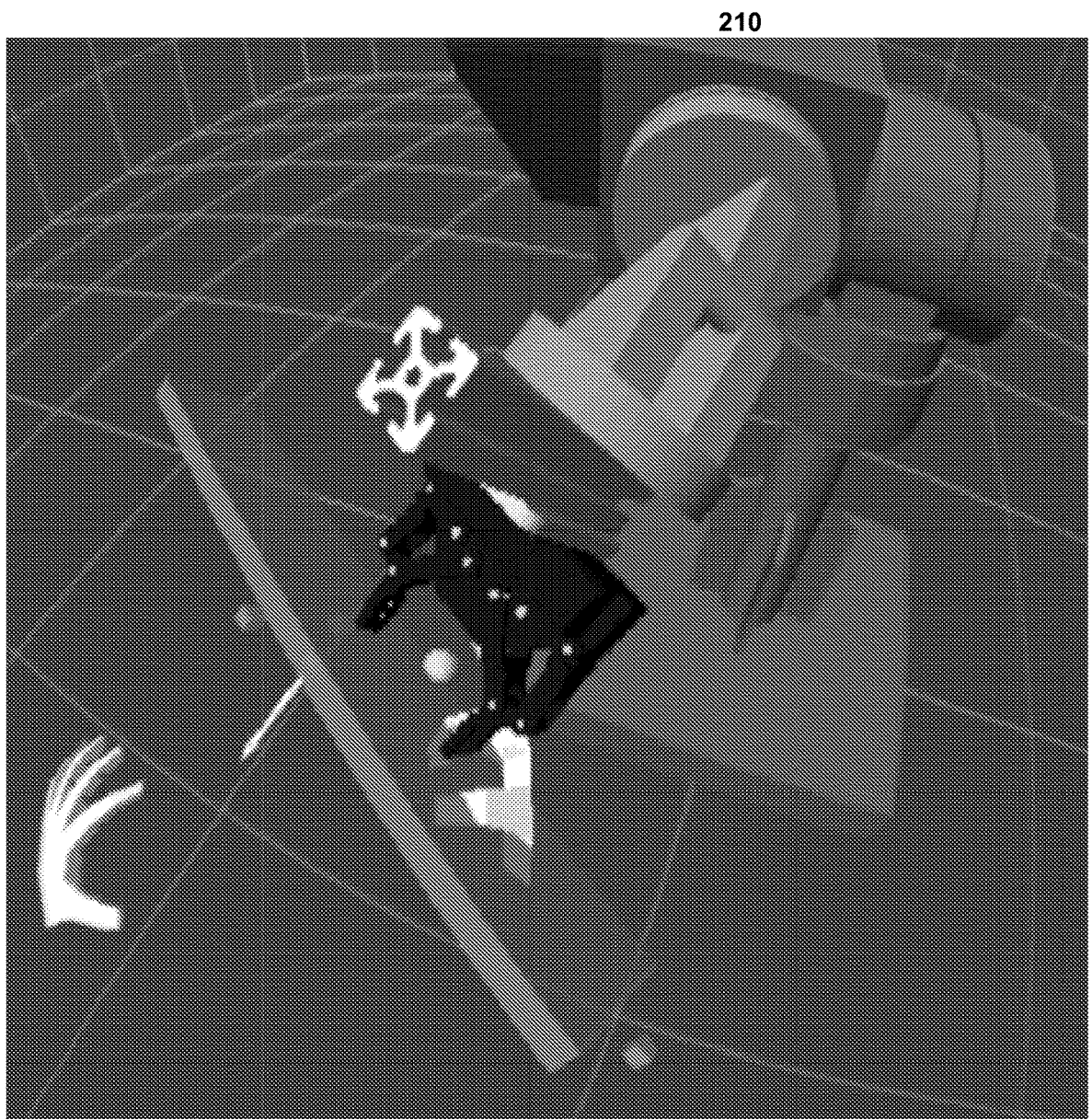
FIG. 16 depicts constraining the motion of the robot to the side of a helper object.

FIG. 16 depicts constraining the motion of robot 210 to the side of the helper object. In FIG. 16, the rectangular VHO constrains the robot's motion so that it is co-planar with the VHO. Helper objects may be created and used to define a constraint which the virtual robot 210 and the real robot 110 will follow. The ability to interactively define virtual constraints for the robot motion in the VRE, which are then translated to physical constraints in the physical world may be provided. The rectangular primitive may be used as a keep out zone where the robot (both virtual and real) cannot enter.

As with kinesthetic teaching, a user's 390 motions are often not precise enough to be used directly for a given task. VHOs may be used as, for example, virtual fixtures to provide constraints on the motion of the user's hand avatars, or the motion of objects in the environment, or the motion of the robot. This constraint takes place with respect to the virtual fixture using some geometric null space projection. This can allow for more precise input.

3D widgets or meshes may be created that may modify the view behind them, providing a "magic window" to look through for additional information or inspection. For example, a sprite that can be manipulated by the user that shows a thermal view of the robot when placed in the user's view of the robot. Real-time 2D or 3D video or depth (point cloud) information on the virtual scene may be displayed overlaid in a geometrically correct manner on any 3D representations in the VRE. For example, 3D point cloud of a table in front of the robot may be displayed in the VDE in the correct position and orientation relative to the robot's virtual proxy representation. Similarly a 2D video stream may be positioned in the VRE according to the viewpoint of the physical camera, with respect to the robot.

Figure 17:
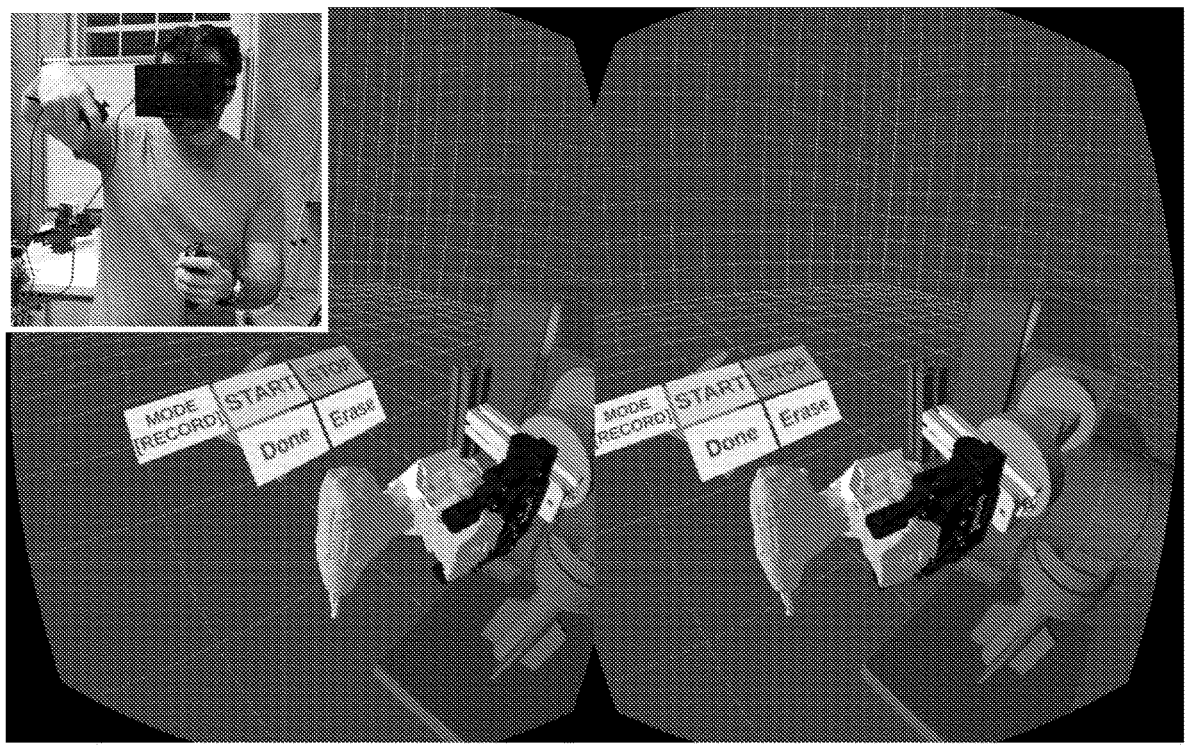
FIG. 17 shows an embodiment programming a demonstration with a virtual tool attached to a virtual robot.

FIG. 17 shows an embodiment programming a demonstration with a virtual tool attached to a virtual robot 210. Virtual objects may represent tools, and may also represent task information more generally. Interactive 3D meshes of tools or other objects may be provided or created that may then be used as a robot training or control proxy. For example a 3D drill model (mesh) may be spawned, which user 390 may grasp in the VRE and manipulates, but in the physical world, the robot 110 has an attached drill and is replicating the user's motion. Also, user 390 could "hand" the robot 210 a drill VHO (e.g., FIG. 17). Such an action, could start a subroutine in the background that loads task parameters related to a previously defined drilling task, such as tool parameters for kinematic and dynamic action, trajectories, and other task parameters This may be an intuitive way to give high level information to the robot about pre-programmed tasks that follows how humans often represent a task as the tool used to accomplish it. Tool VHOs could also be used to train users with a novel device before performing action on the real robot 110.

In another embodiment, the VRE could be used to train a user to interact with a physical robot, by providing exactly the same interface to the real robot as is available in real life. Furthermore, the VRE could be used to train a user a specific programming or task specification language in the "safe" virtual environment, where they can experiment with the simulated robot without any physical recourse.

Combination 3D meshes/UI/VIDs may also be created that can be manipulated by the user as, for example, tools may be provided. For example, a 3D mesh shaped like a tablet computer, which may display a UI or VID on its "screen." The combination interfaces may be docked with the user's avatar for storage. For example, the tablet may be hung on the user's belt for later use.

In one embodiment, VHOs may also be used for interactive perception. Because VHOs may be moved and resized, user 390 could place a VHO over a real world scene object in the virtual point cloud, and scale the VHO to the correct size. This serves to define the location and extent of the physical object with respect to the real robot, by mapping the virtually specified position (using the VHO) to the coordinate system of the real robot. That physical object's positional information can then be used by the robot for interaction with the object. This is an intuitive method for transferring scene information to the robot, (the equivalent of one human user saying to another "the ball is there" while pointing at a ball) which might not be equipped with scene parsing algorithms, for example.

In one embodiment, multiple robots (local, remote, or a combination) may be managed via IVRE avatars. The ability to represent remote, but geographically co-located systems in the VRE by grouping them close together in the VRE may be provided. For example, user 390 may be controlling four robots, two in a local factory, and two in a factory in another state. The avatars representing the local robots may be next to one another, but on one side of the virtual environment (a room) while the two robots in the other state will be near each other, but across the other side of the room. The ability to represent uncertainty about a state of a robot (or delay in the state information) using graphical cues, either directly on the 3D avatar of the robot or using 3D graphical widgets may be provided. For example, if the information about a remote robot becomes stale, or delayed, the information display (or the robot avatar itself) could become more and more transparent. In the case of a VUI displaying the information, it could change color with increasing staleness.

In one embodiment, gestures may allow for communication. The ability for user gestures to move, dismiss, evoke or otherwise interact with both 3D UIs, VIDs or 3D models (such as the representation of the robot itself) may be provided. For example, a notification VUI can be dismissed by flicking it away. The ability to use the interaction of gestures with 3D entities (such as a robot avatar) to enact real world events may be provided. For example, a user may shut down a robot by pushing its avatar away in the VRE. The ability to navigate in third person mode using a "grab and pull" gesture may be provided. For example, if a user needs to travel some distance in the VRE, and therefore reaches forward with both hands, grabs with both hands, and then pulls towards his body, which causes him to move some distance in the VRE. The ability to engage/disengage from control/interaction with a robot avatar in first person perspective using gestures may be provided. For example, when the robot's end effector is following the user's hand position in first person mode, the user can wave with the other hand to disengage following.

Figure 18:
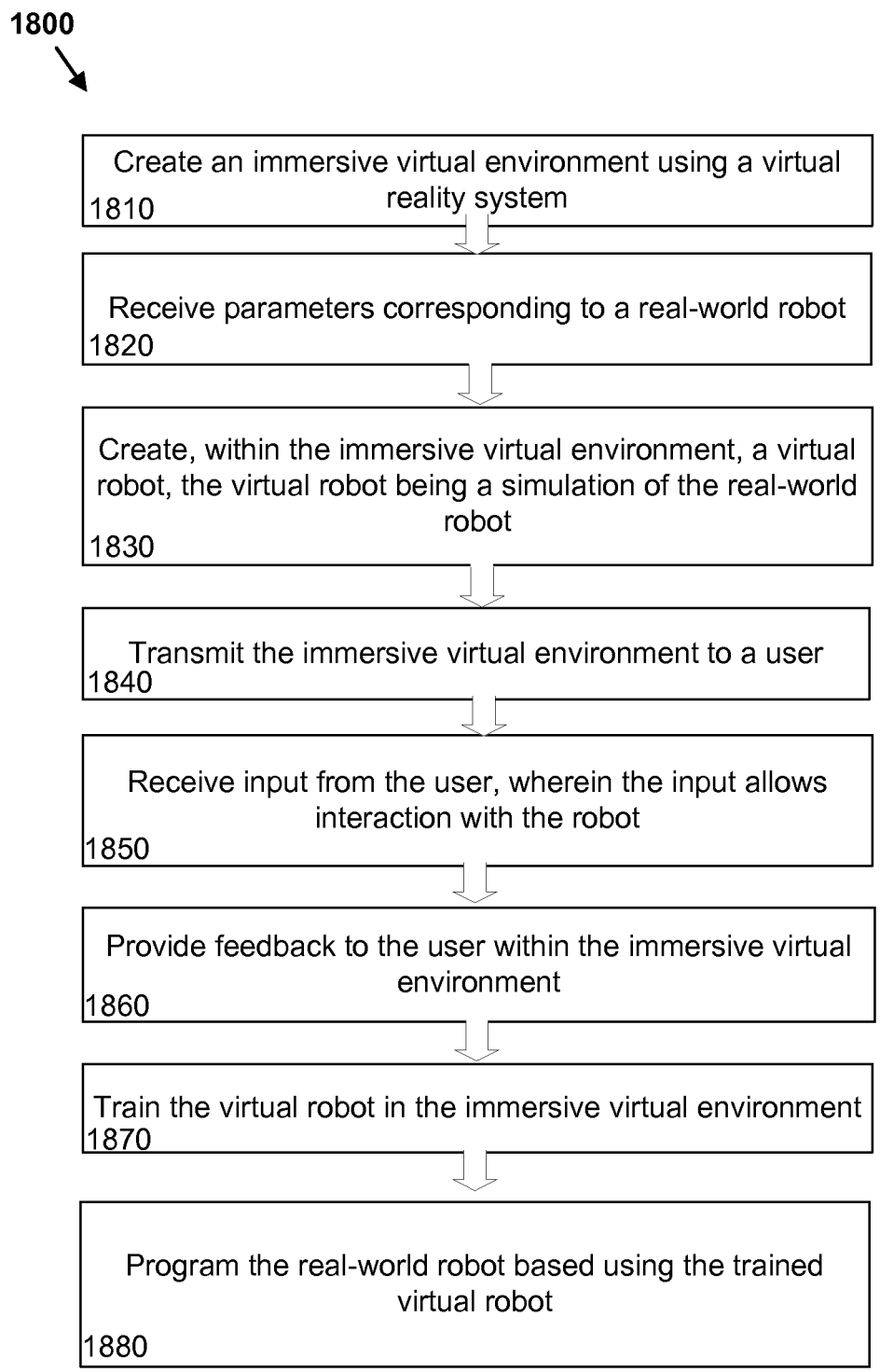
FIG. 18 depicts an illustrative workflow for training a dexterous entity.

FIG. 18 depicts an illustrative workflow for training a dexterous entity. In 1810, an immersive virtual environment (IVE) may be created. The IVE may be created within a virtual reality system. The virtual reality system may be created using an OpenGL graphical environment, with a stereoscopic display viewpoint, coupled with a head mounted stereo display, which can track the user's position and orientation, and map that into the virtual environment as a change in viewpoint. A set of hand or body tracking devices can provide a real time avatar of the user's hand or body positions. Software may then update the virtual viewpoint based on the user's position and orientation, as well as head position and orientation, to create a fully immersive experience. Within the virtual reality system, the IVE may be created using 3D scene content to create a virtual environment, 3D and 2D textured meshes and sprites to create entities that the user can interact with, a 3D textured mesh of the robot, and other 3D data from real time or recorded sensor data. Software may provide interaction between the user's virtual representation and entities in the environment, by interaction distance or ray casting. Other software may update real world assets such as a robot based on changes made in the virtual environment. The virtual environment may also simulate a physics based environment, where objects act appropriately due to the force of gravity or other simulated environments, such as the gravity of other planets. Such an IVE may also include collision models, or dynamic models for entities to enable collision or deformation. The user may also switch between different IVEs without changing the physical configuration of the system. The IVE may include a virtual reality environment, an augmented reality environment (e.g., an augmented environment), or augmented virtuality.

In one or more embodiments, the IVE may be used as a sandbox, for example, for learning robot programming or task plan specification using said virtual robot; multiple users and/or multiple robots may interface with the same IVE; the IVE may display a real time representation of real life environments with the ability to seamlessly transition between the real life environment and the virtual environment; and/or the IVE may display the forces applied by the robot, or other objects, as sensed by the real world robot. From 1810, flow may move to 1820.

In 1820, parameters may be received to describe a real-world dexterous entity (e.g., robot 110, an industrial robot, a domestic robot, an articulated welding robot, an autonomous robot, a military robot, a medical robot, etc.). The parameters may be used by the IVE to create a virtual representation of the real-world dexterous entity (e.g., virtual robot 210). The virtual dexterous entity may have the same limitations and features as the real-world dexterous entity, by using the kinematic and dynamic model of the robot, as well as the appearance model of the robot to provide a robot that moves, acts and looks just as the real robot does. This includes kinematic limitation such as joint limits, singularities and self-collisions. For instance, the kinematic model of the robot could be created from the Denavit-Hartenberg parameters of the robot, and combined with Lagrange's equations to create a dynamic model for the robot. The dynamic and kinematic model of the robot are then incorporated into the control software for the real robot, and the simulation control software of the virtual robot. The real-world dexterous entity may be remotely operated a distance from the user (e.g., in another state, in the ocean, in space, etc.), located in a hazardous environment, and/or too dangerous for the user to be in close proximity. From 1820, flow may move to 1830.

In 1830, the virtual dexterous entity may be created in the IVE. The virtual dexterous entity representing a simulation of the real-world dexterous entity. The virtual dexterous entity may represent one or more real-world dexterous entities. From 1830, flow may move to 1840.

In 1840, the virtual reality system may transmit the IVE to a user 390. The user 390 may view the IVE using one or more visual devices (e.g., one or more monitors, a stereoscopic 3D display, a virtual reality headset, an augmented reality device, virtual reality goggles, augmented reality glasses, Oculus Rift™, Google Glass™, etc.). The IVE may also transmit sound to the user 390 through one or more audio devices (e.g., speakers, headsets, earphones, etc.). This sound can be static, or can be generated in a geometrically appropriate manner based on the position or orientation of the user in the environment (for instance, the sound from the robot gets louder when the user is closer to the virtual robot).

In one embodiment, the IVE may be configured to: define virtual constraints for the virtual robot, where the virtual constraints may be translated physical constraints imposed on the real-world robot; display real-time 2D or 3D video or depth information on a virtual scene overlaid in a geometrically correct manner on any 3D representation in the IVE; and/or display forces applied by the robot, or other objects, as sensed by the real-world robot.

User 390 may view the virtual dexterous entity multiple perspectives, and these multiple perspectives may be selectable by user 390. For example, the user 390 may view the dexterous entity from an egocentric perspective, where the user 390 operates the virtual dexterous entity from a point of view of the virtual dexterous entity. For example, an image of an arm of the virtual dexterous entity may be overlaid where an arm of user 390 would be in real life. In another perspective, user 390 may view the virtual dexterous entity inside the IVE from a point of view external to the virtual dexterous entity (e.g., exocentric perspective). From 1840, flow may move to 1850.

In 1850, the IVE may receive input from the user 390. User 390 may supply input using one or more sensors to detect body position and direction, and other input devices (e.g., joystick, button, keyboard, mouse, etc.) Body position sensors may detect head direction and position (e.g., Oculus Rift™), arm position and direction, hand position (e.g., Razor Wands™), body position, and the body position of more than one user. This includes both body orientation and the spatial location of the user with respect to some physical coordinate system. User 390 input may provide interaction with the virtual dexterous entity. In one embodiment, the motions of the virtual dexterous entity correspond in real-time (or near real-time) to that of the real-world dexterous entity. User 390 may program the virtual dexterous entity using a virtual user interface. From 1850, flow may move to 1860.

In 1860, feedback may be provided from the IVE to user 390. Feedback may include a virtual information display (VID), wherein the virtual information display may include a 2D sprite or a 3D mesh. Additionally, the VID may be textured or shaded. The VID may be locked to the virtual dexterous entity, locked to a view of the user, and/or locked to an avatar of the user. The IVE may also include mixed reality user interfaces (UIs). This could include a physical peripheral, such as a tablet, that the user holds, which matches the position of a virtual tablet with respect to the user's viewpoint. This means that UIs may be configured to be adjusted by the user, locked to an avatar of the user, locked to the virtual dexterous entity, and/or locked with respect to the viewpoint of the user.

The IVE may provide user 390 the ability to define geometric primitives or detailed 3D mesh objects. These objects may be overlays of real time sensing data to define geometric regions for interaction for the real-world dexterous entity. The IVE may provide user 390 with the ability to define virtual constraints for the virtual dexterous entity. The virtual constraints may be translated into physical constraints imposed on the real-world dexterous entity. The IVE may also provide real-time 2D or 3D video or depth information on a virtual scene overlaid in a geometrically correct manner on any 3D representation in the IVE. In one embodiment, the virtual information displays (e.g., VID, UIs) provided to user 390, may be placed on the other side of a visual scene so that the information is rendered on top of the scene and is not placed between the user's and the scene.

In one embodiment, the IVE may not provide the user with the ability to physically feel the touch of virtual objects. Instead, the IVE may provide an interaction zone alerting user 390 that the user 390 may interact with an object. For example, when user 390 moves an avatar close to a button object, an indication may be provided to alert user 390 that the button may be pressed. For example, a button may glow, the opacity of the robot may change, vibration, and/or a sound may be transmitted to user 390. Visual cues can also be used in the virtual environment to denote forces on the robot. For instance, parts of the robot avatar could glow red if the force exerted by the robot is too great. From 1860, flow may move to 1870.

In 1870, the virtual dexterous entity may be trained by user 390 within the IVE. Such training includes dexterous entity motion and tasks. Once a series of motions and tasks have been given to the virtual dexterous entity, the virtual dexterous entity can replay the instructions to user 390.

From 1870, flow may move to 1880.

In 1880, the real-world dexterous entity receives the training provided to the virtual dexterous entity. For example, robot 110 is programmed with the instructions given to the virtual robot 210. The transmission of instructions from virtual robot can take place in two ways. First, if the virtual robot has exactly the same kinematic and dynamic model as the real world robot, then any trajectories or waypoints instructed to the virtual robot then can be used immediately by the real system. Should the real system differ in kinematic or dynamic model, then software may translate any Cartesian trajectories or waypoints into the reference frame of the real robot, provided that the robot has the same degrees of freedom. T virtual robot and real robot drivers may be connected by a network interface. Finally, any task programs or plans that are instructed to the virtual robot may be directly used by the real robot assuming the hardware capabilities of the robot match the virtual robot (i.e. if the task plan calls for grasping an object, the real robot must have a gripper). This is also the case for transferring instructed information from a real system to a virtual system, assuming the above constraints.

Using the IVE, user 390 may receive training on the real-world dexterous entity or other real-world tools by first using the virtual dexterous entity or a virtual tool in the IVE. By using the embodiments disclosed herein, robots may be programmed in a safe environment and one that is intuitive to the user 390. As the robot programming is performed at a high level, user 390 will not need detailed robotic programming knowledge to re-task or initially program one or more robots.

In one embodiment, an IVRE was implemented on a physical testbed consisting of a 6-DOF American Robot Merlin™ welding robot, with a Robotiq 2-Finger Adaptive Gripper as an end effector. Sensing was accomplished by a PrimeSense Carmine™ RGBD camera, rigidly attached to a workbench placed inside the workspace of the robot.

The IVRE was implemented on top of the Robot Operating System (ROS) as a series of loadable software objects that can be spawned by RVIZ, a robot visualization environment in ROS that uses Ogre as its 3D engine. These objects augment the standard RVIZ package to allow for the virtual interaction described in this document. Visualization of the virtual environment was accomplished by using the OculusVR® Rift stereo display, which incorporates ultra-low latency head orientation tracking. For input, the Razer Hydra motion controller was used, which tracks the 6-DOF position and orientation of two hand-held wands and provides additional input such as analog joysticks and buttons.

To characterize IVRE for use as an industrial robot interface, a preliminary comparison of different virtual control viewpoints and control mappings as well as a comparison of visualization modalities for real-time viewing of the robot's physical task space was conducted.

Figure 19:
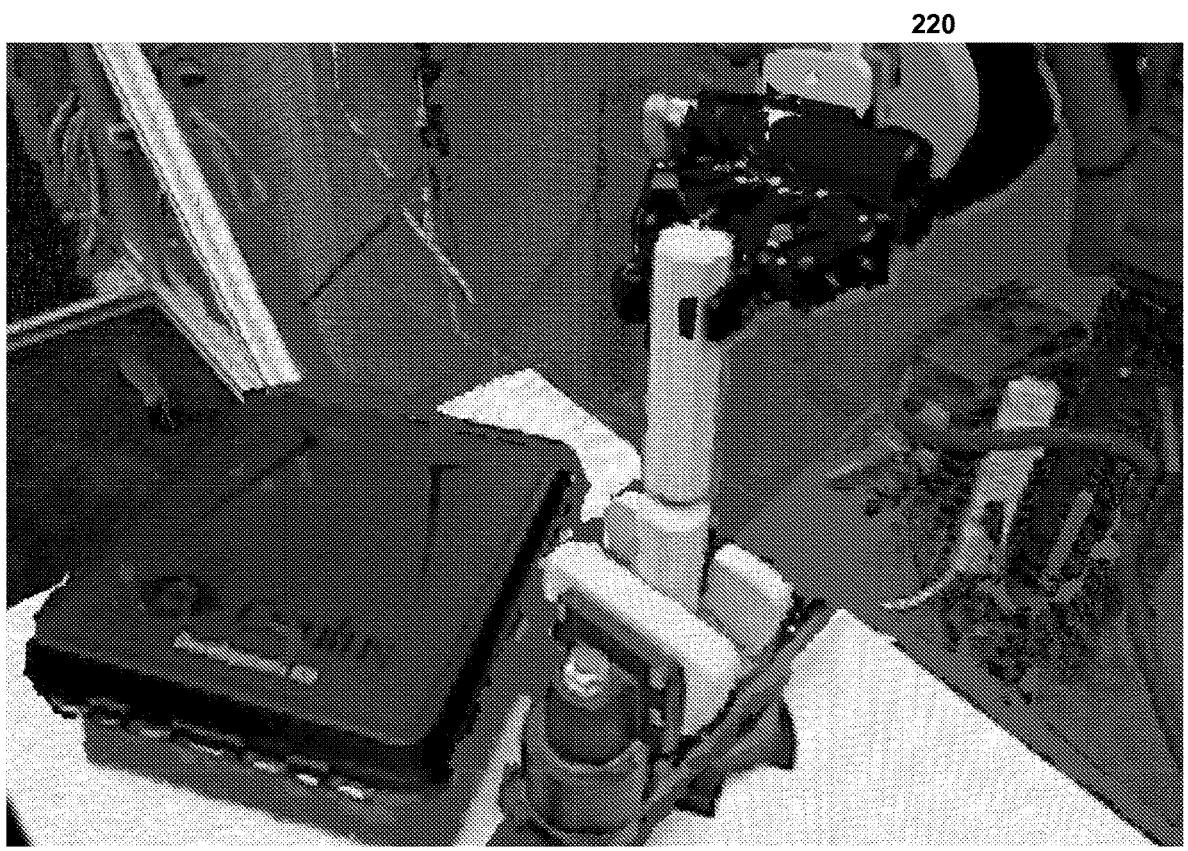
FIG. 19 depicts a virtual Point cloud view of a pick-and-place task.

For the first analysis, a test to compare what effect egocentric and exocentric perspective has on efficiency of performing tasks in VR was performed. The task was an object placement task as seen in FIG. 19. FIG. 19 depicts a virtual Point cloud view of a pick-and-place task. The efficiency of performing the task in terms of accuracy in position, orientation, and speed was measured. The object used in the task was an octagonal wood block measuring 35 mm wide and 140 mm tall, and the task flow was to pick it up and place it atop an identical block with as close as possible alignment.

The user 390 was placed in IVRE and controlled the robot 210 with virtual kinesthetic guidance using Razer Hydra wands. Two sets of tests were performed, with each test consisting of three trials each. In the first test the users were in an exocentric perspective, where the user's viewpoint is co-located with the robot, and the robot directly mimics the user's actions. In the second task the user was in an egocentric perspective, where the robot followed the user's actions relative to the user's perspective. In exocentric perspective, the user was free to move around in the virtual space arbitrarily.

To compare the efficiency of using IVRE to traditional robot operation methods, the same task as above was performed without the virtual reality component. The virtual exocentric viewpoint was replaced with the user controlling the robot with Razer Hydra wands using their own eyesight, in a position approximately 1 meter from the robot (outside its reachable workspace). Because it is not possible for the user to physically assume a first person position with respect to the robot, the egocentric perspective was replaced with a PointGray Bumblebee stereo camera, attached to a tripod and placed in a first person position above the robot, aligned with the virtual egocentric viewpoint with respect to the robot. The task was otherwise identical. Since the user has no virtual interaction sphere to grab on in real life, the interaction was modified so that the user could "grab" the robot from any position by pulling the trigger of the Razer wand. The motion of the robot would then start relative to that initial hand position.

Figure 20:
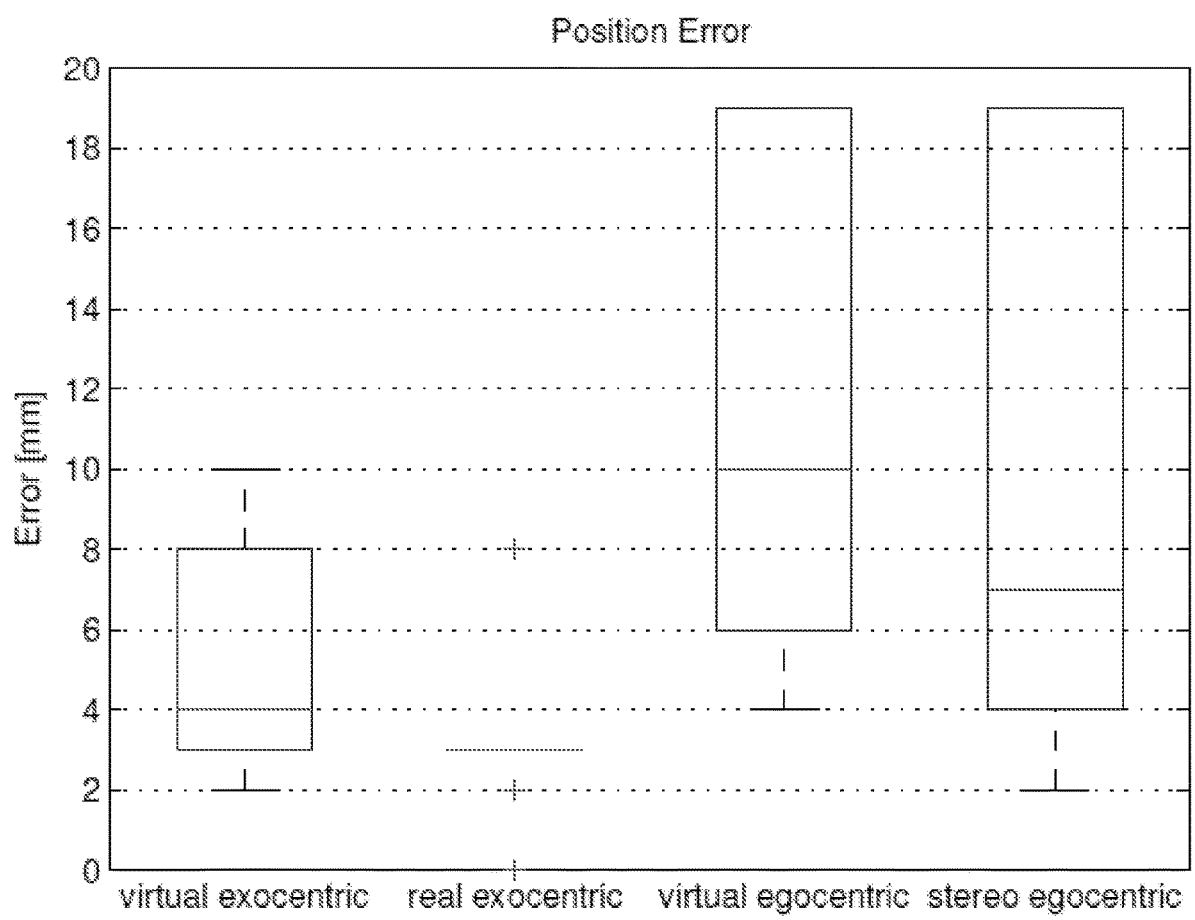
FIG. 20 depicts a box plot of position error across various viewpoints.
Figure 22:
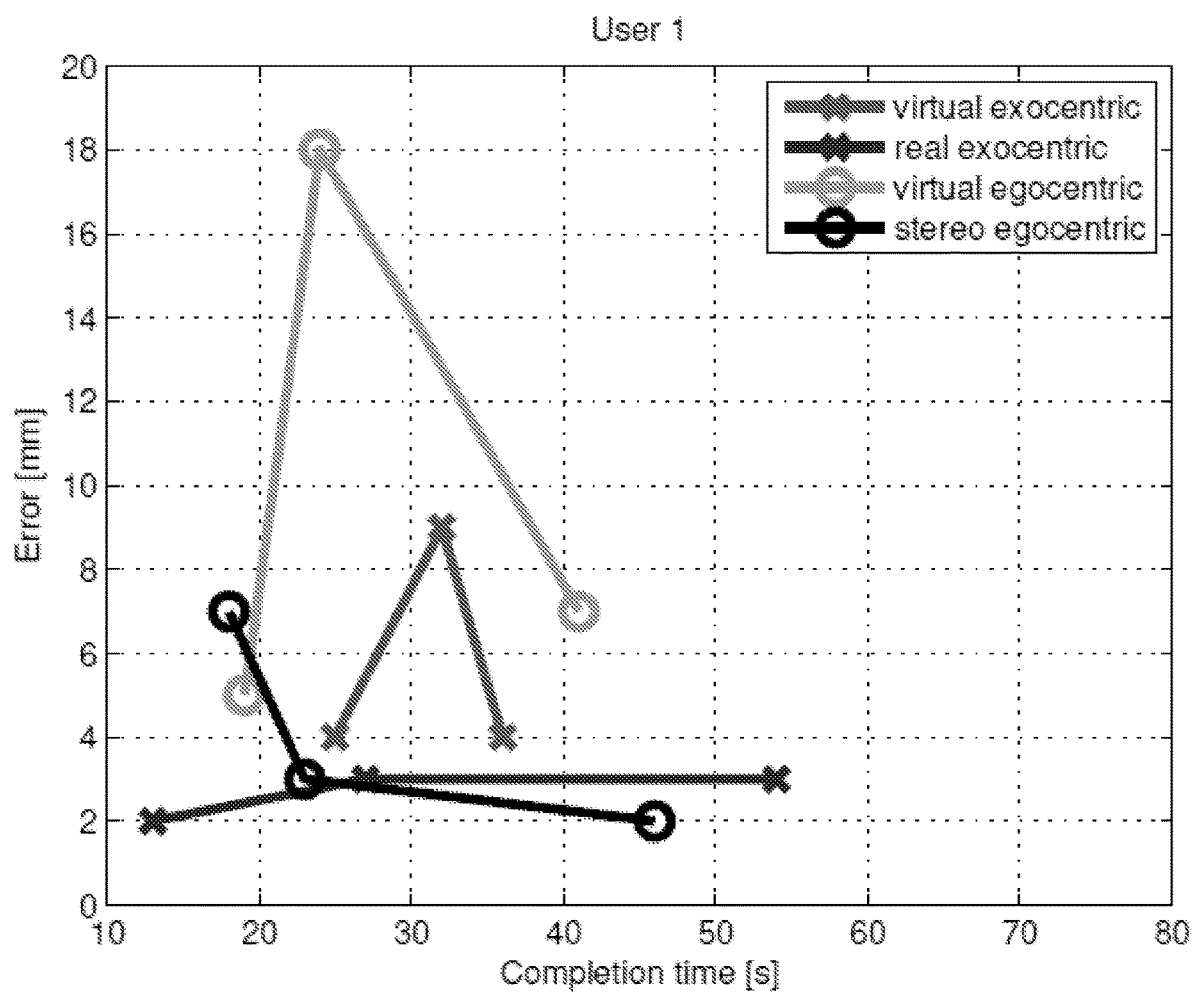
FIGS. 22-24 depict a plot of error versus completion time for each user under each interaction mode.
Figure 23:
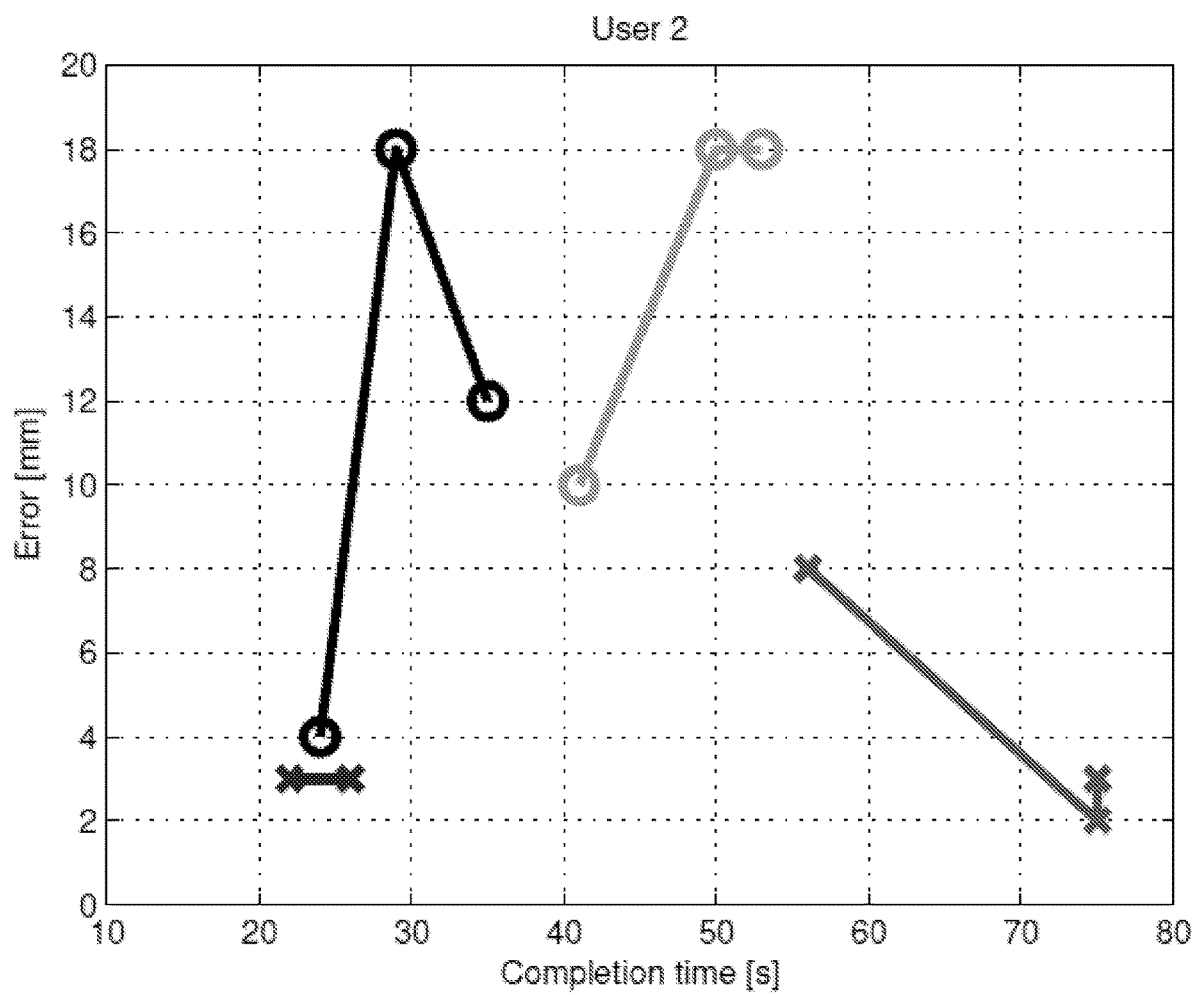
Figure 24:
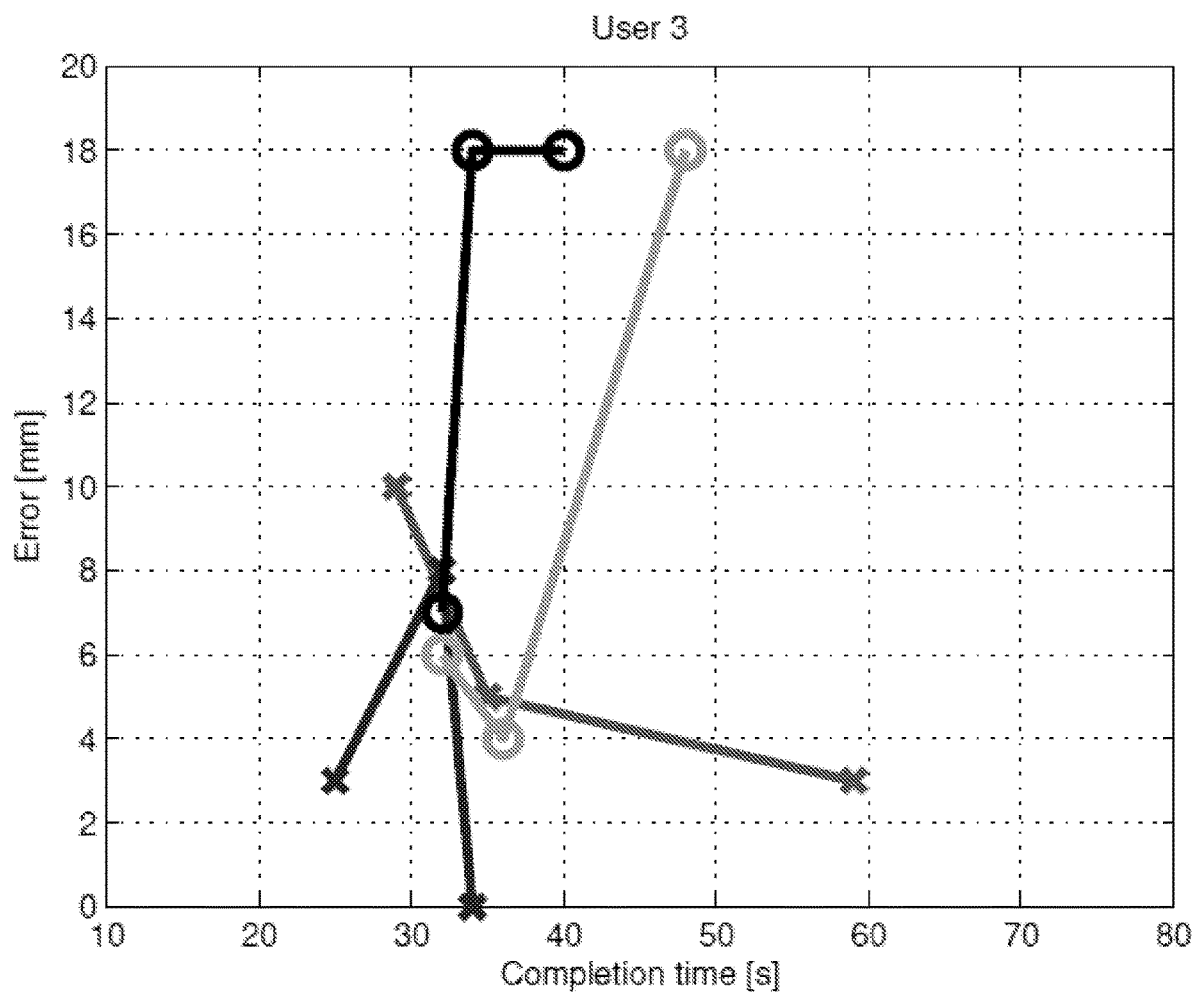

FIG. 20 depicts a box plot of position error across various viewpoints. As shown in FIG. 20, real vision provided better performance (smaller position error) than virtual reality, however, virtual reality accuracy and speed was comparable to real vision. In fact, as can be seen in FIGS. 22-24 (depicting a plot of error versus completion time for each user under each interaction mode), the performance of egocentric and exocentric viewpoints in real life was very closely tied to their virtual reality counterpart. Thus, virtual reality is a close analogue for the task in both viewpoints in terms of precision.

Figure 21:
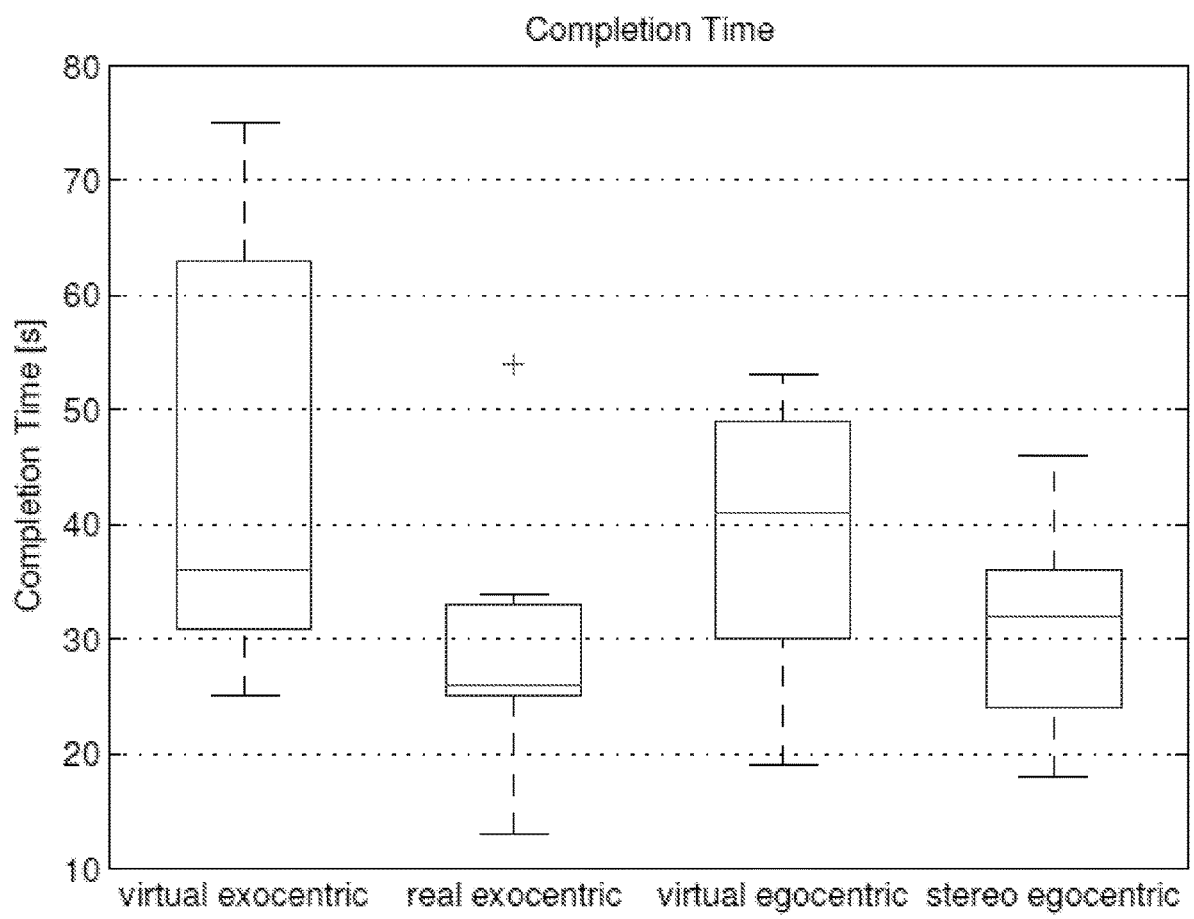
FIG. 21 depicts a box plot of completion time across various viewpoints.

FIG. 21 depicts a box plot of completion time across various viewpoints. As can be seen in FIG. 21, neither type of viewpoint had a considerable advantage in terms of speed over the other, both in real life and in virtual reality. It is noteworthy that the task took a slightly longer time in VR.

Due to the octagonal blocks used having a width of 35 mm, placement errors of 18 mm or greater caused the placed object to topple and fall, which was deemed as the user failing the task. As can be seen in FIGS. 22-24, the only time the users failed the task was when they were in egocentric views, both virtual and real.

Exocentric mappings have a demonstrable advantage over egocentric ones in terms of accuracy, while having comparable speed (e.g., FIG. 21). This can be tied to several observations noted below.

The ability to move to an arbitrary perspective to better align the block was noted by the subjects as the biggest advantage of this perspective. While the subjects noted that the increased proprioception from the egocentric perspectives helped with immersion, they also noted that the robot's arm occluding the workspace made the task harder.

One outcome that was not anticipated, was users hitting the joint limits of the robot and getting stuck more often in egocentric view than otherwise. The ability to monitor the robot's state in exocentric views prevented this from occurring during those tests. While the added immersion and proprioceptive control of egocentric perspectives provided advantageous in fine manipulations of the end effector of the robot, due to the arm of the robot not being kinematically similar to a human arm, the robot was overall more difficult to maneuver precisely in this view.

Another interesting aspect of the test was that all three participants performed differently, both in terms of trajectory of motion and quantifiable results, as seen in FIGS. 22-24. In the exocentric virtual task, one user preferred to view the robot gripper from the side when picking the object up and from ahead when placing it; whereas another user did the exact opposite. This speaks to the flexibility of the exocentric viewpoint and the fact that users were able to take the position they were comfortable with is shown by the higher accuracy and lower speed of those viewpoints compared to the egocentric ones. Conversely, not only users did not spend time on adjusting their perspective in egocentric views, they also spent less time adjusting the gripper's angle of approach due to the intuitive mapping between their hand and the gripper, and this is apparent in the time results for the egocentric perspective. Generally, users typically picked a viewing position that is mostly co-axial with the point cloud source. This raises questions about how users cope with partial information from RGBD sensors.

One other instance of a user doing the tasks differently than others was, instead of just placing the block on top of the target and letting it go after aligning, this user rested the block on the target and pushed it around, using the slack in the grippers to nudge the block into place before letting go. The high fidelity of the Razer wands was able to capture subtle motions like this and emulate kinesthetic guidance without actual contact between the user and the robot.

Generally, the experience with the Oculus Rift as a display and tracking device was positive. With the caveat that this is a first-generation device, the tracking was low latency with few temporal image artifacts. The resolution of the display, being only 720×640 pixels per eye, was somewhat low, but it did not have any detrimental effect on our experiments. Additionally, the fact that the device only tracks user head orientation and not position, was slightly disorienting because translation of the user's head did not invoke any 3D movement in the scene. Future versions of the device promise higher resolution, position tracking and better latency. The mapping between the views from the stereo camera and each eye's display in the Oculus Rift was different from user to user, as users had different inter-pupillary distance which led to the vergence of the images needing to be calibrated between users.

Additional features include manipulating a robot from a distance in the virtual environment. For example, if a user is trying to make the robot move an object while viewing the robot from afar in the virtual environment, they may not be able to grab the robot and guide it. In fact, they may not be able to interact with any virtual entity that is not within arm's reach. This problem may be solved by casting a ray from the user's hand to distant objects to "pick" them and interact with them. Other features include the ability to modify the scale between the user's mapping and the robot's actions. If the user wanted to make extremely precise motions, they could map the robot to move at a scaled down speed compared to their virtual hands. Conversely, they could also make the robot move much faster with small motions. This may drastically improve work flow and efficiency for tasks depending on how much precision they demand.

Figure 25:
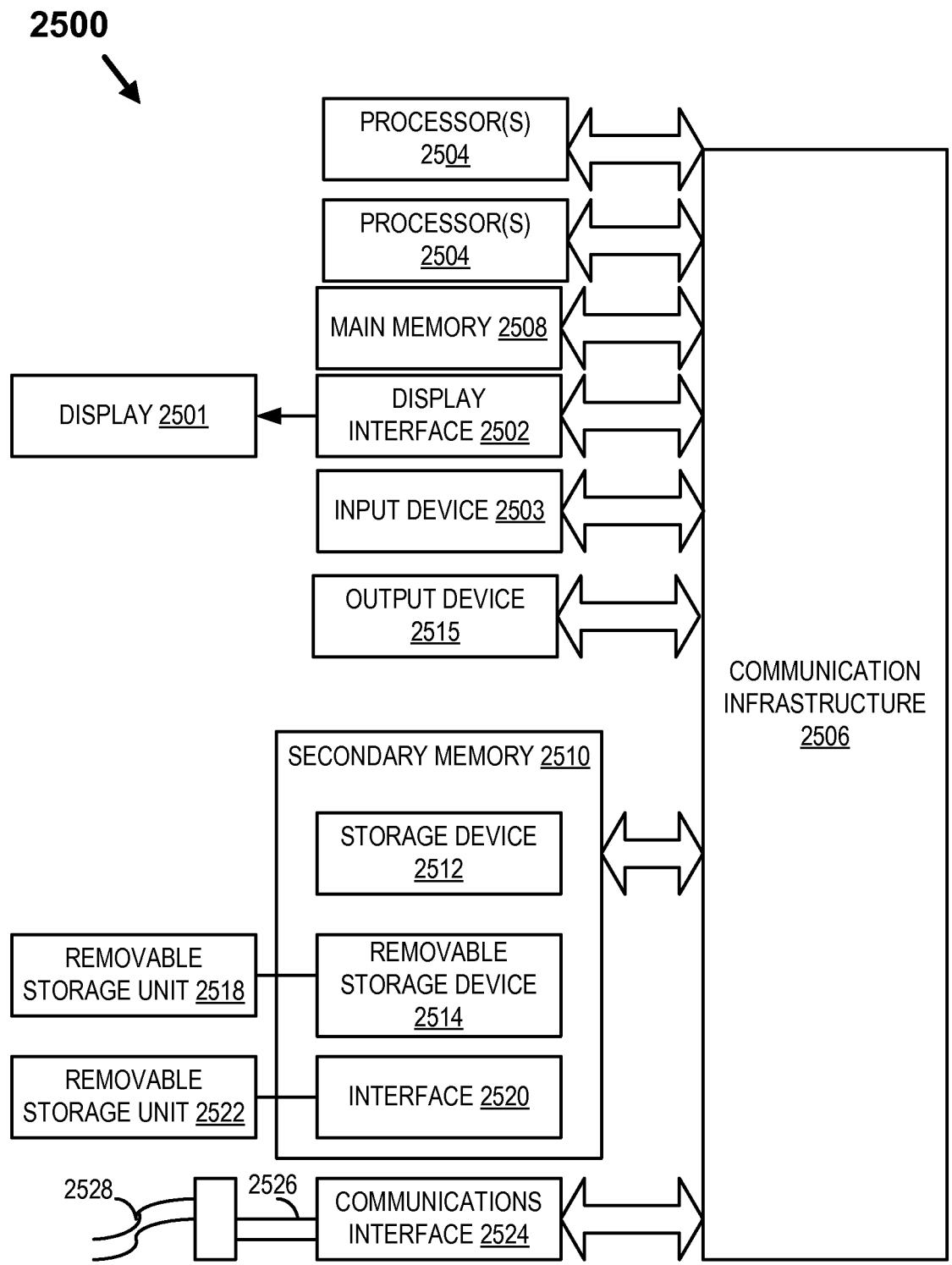
FIG. 25 depicts an illustrative embodiment of a computer for performing the methods and building the systems described herein.

FIG. 25 depicts an illustrative computer system that may be used in implementing an illustrative embodiment of the present invention. Specifically, FIG. 25 depicts an illustrative embodiment of a computer system 2500 that may be used in computing devices such as, e.g., but not limited to, standalone or client or server devices. FIG. 25 depicts an illustrative embodiment of a computer system that may be used as client device, or a server device, etc. The present invention (or any part(s) or function(s) thereof) may be implemented using hardware, software, firmware, or a combination thereof and may be implemented in one or more computer systems or other processing systems. In fact, in one illustrative embodiment, the invention may be directed toward one or more computer systems capable of carrying out the functionality described herein. An example of a computer system 2500 is shown in FIG. 25, depicting an illustrative embodiment of a block diagram of an illustrative computer system useful for implementing the present invention. Specifically, FIG. 25 illustrates an example computer 2500, which in an illustrative embodiment may be, e.g., (but not limited to) a personal computer (PC) system running an operating system such as, e.g., (but not limited to) MICROSOFT® WINDOWS® NT/98/2000/XP/Vista/Windows 7/Windows 8, etc. available from MICROSOFT® Corporation of Redmond, Wash., U.S.A. or an Apple computer or tablet executing MAC® OS, OS X, or iOS from Apple® of Cupertino, Calif., U.S.A., or a computer running a Linux or other UNIX derivative. However, the invention is not limited to these platforms. Instead, the invention may be implemented on any appropriate computer system running any appropriate operating system. In one illustrative embodiment, the present invention may be implemented on a computer system operating as discussed herein. An illustrative computer system, computer 2500 is shown in FIG. 25. Other components of the invention, such as, e.g., (but not limited to) a computing device, a communications device, a telephone, a personal digital assistant (PDA), an iPhone, an iPad, a Surface, and Android device, a 3G/4G wireless device, an LTE device, a wireless device, a personal computer (PC), a handheld PC, a laptop computer, a smart phone, a mobile device, a netbook, a handheld device, a portable device, an interactive television device (iTV), a digital video recorder (DVR), client workstations, thin clients, thick clients, fat clients, proxy servers, network communication servers, remote access devices, client computers, server computers, peer-to-peer devices, routers, web servers, data, media, audio, video, telephony or streaming technology servers, etc., may also be implemented using a computer such as that shown in FIG. 25. In an illustrative embodiment, services may be provided on demand using, e.g., an interactive television device (iTV), a video on demand system (VOD), via a digital video recorder (DVR), and/or other on demand viewing system. Computer system 2500 and/or parts of computer system 2500 may be used to implement dexterous entity, robot 110, virtual robot 210, immersive virtual environment, and/or other components as described in FIGS. 1-2, 4-17, and 19 and techniques described in FIGS. 3 and 18.

The computer system 2500 may include one or more processors, such as, e.g., but not limited to, processor(s) 2504. The processor(s) 2504 may be connected to a communication infrastructure 2506 (e.g., but not limited to, a communications bus, cross-over bar, interconnect, or network, etc.). Processor 2504 may include any type of processor, microprocessor, or processing logic that may interpret and execute instructions (e.g., for example, a field programmable gate array (FPGA)). Processor 2504 may comprise a single device (e.g., for example, a single core) and/or a group of devices (e.g., multi-core). The processor 2504 may include logic configured to execute computer-executable instructions configured to implement one or more embodiments. The instructions may reside in main memory 2508 or secondary memory 2510. Processors 2504 may also include multiple independent cores, such as a dual-core processor or a multi-core processor. Processors 2504 may also include one or more graphics processing units (GPU) which may be in the form of a dedicated graphics card, an integrated graphics solution, and/or a hybrid graphics solution. Various illustrative software embodiments may be described in terms of this illustrative computer system. After reading this description, it will become apparent to a person skilled in the relevant art(s) how to implement the invention using other computer systems and/or architectures.

Computer system 2500 may include a display interface 2502 that may forward, e.g., but not limited to, graphics, text, and other data, etc., from the communication infrastructure 2506 (or from a frame buffer, etc., not shown) for display on the display unit 2501. The display unit 2501 may be, for example, a television, a computer monitor, iPad, a mobile phone screen, Oculus Rift™, Google Glass™, a stereoscopic 3D display, a virtual reality headset, an augmented reality device, virtual reality goggles, augmented reality glasses, etc. The output may also be provided as sound through, for example, headphones, speaker(s), etc.

The computer system 2500 may also include, e.g., but is not limited to, a main memory 2508, random access memory (RAM), and a secondary memory 2510, etc. Main memory 2508, random access memory (RAM), and a secondary memory 2510, etc., may be a computer-readable medium that may be configured to store instructions configured to implement one or more embodiments and may comprise a random-access memory (RAM) that may include RAM devices, such as Dynamic RAM (DRAM) devices, flash memory devices, Static RAM (SRAM) devices, etc.

The secondary memory 2510 may include, for example, (but is not limited to) a hard disk drive 2512 and/or a removable storage drive 2514, representing a floppy diskette drive, a magnetic tape drive, an optical disk drive, a compact disk drive CD-ROM, flash memory, etc. The removable storage drive 2514 may, e.g., but is not limited to, read from and/or write to a removable storage unit 2518 in a well-known manner. Removable storage unit 2518, also called a program storage device or a computer program product, may represent, e.g., but is not limited to, a floppy disk, magnetic tape, optical disk, compact disk, etc. which may be read from and written to removable storage drive 2514. As will be appreciated, the removable storage unit 2518 may include a computer usable storage medium having stored therein computer software and/or data.

In alternative illustrative embodiments, secondary memory 2510 may include other similar devices for allowing computer programs or other instructions to be loaded into computer system 2500. Such devices may include, for example, a removable storage unit 2522 and an interface 2520. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 2522 and interfaces 2520, which may allow software and data to be transferred from the removable storage unit 2522 to computer system 2500.

Computer 2500 may also include an input device 2503 which may include any mechanism or combination of mechanisms that may permit information to be input into computer system 2500 from, e.g., a user. Input device 2503 may include logic configured to receive information for computer system 2500 from, e.g. a user. Examples of input device 2503 may include, e.g., but not limited to, a joystick, a mouse, pen-based pointing device, or other pointing device such as a digitizer, a touch sensitive display device, and/or a keyboard or other data entry device (none of which are labeled). Other input devices 2503 may include, e.g., but not limited to, a biometric input device, a video source, an audio source, a microphone, a web cam, a video camera, a light-sensitive device, and/or other camera. Still other input devices 2503 may include, e.g., but not limited to, an imaging device, a light-sensitive device, sensing elements, body position and direction sensors (e.g., Razor Wands™, Wii controllers, etc.), accelerometers, gyroscopes, and/or magnetometers.

Computer 2500 may also include output devices 2515 which may include any mechanism or combination of mechanisms that may output information from computer system 2500. Output device 2515 may include logic configured to output information from computer system 2500. Embodiments of output device 2515 may include, e.g., but not limited to, display 2501, and display interface 2502, including displays, printers, speakers, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc. Computer 2500 may include input/output (I/O) devices such as, e.g., (but not limited to) input device 2503, communications interface 2524, cable 2528 and communications path 2526, etc. These devices may include, e.g., but are not limited to, a network interface card, and/or modems.

Communications interface 2524 may allow software and data to be transferred between computer system 2500 and external devices.

In this document, the terms "computer program medium" and "computer readable medium" may be used to generally refer to media such as, e.g., but not limited to, removable storage drive 2514, a hard disk installed in hard disk drive 2512, memory unit, flash memories, removable discs, non-removable discs, etc. In addition, it should be noted that various electromagnetic radiation, such as wireless communication, electrical communication carried over an electrically conductive wire (e.g., but not limited to twisted pair, CAT5, etc.) or an optical medium (e.g., but not limited to, optical fiber) and the like may be encoded to carry computer-executable instructions and/or computer data that embodiments of the invention on e.g., a communication network. These computer program products may provide software to computer system 2500. It should be noted that a computer-readable medium that comprises computer-executable instructions for execution in a processor may be configured to store various embodiments of the present invention. References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic.

Further, repeated use of the phrase "in one embodiment," or "in an illustrative embodiment," do not necessarily refer to the same embodiment, although they may. The various embodiments described herein may be combined and/or features of the embodiments may be combined to form new embodiments.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments may be embodied in many different ways as a software component. For example, it may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. A general purpose computer may be specialized by storing programming logic that enables one or more processors to perform the techniques indicated herein and the steps of or descriptions shown in, for example, FIGS. 3 and 18.

Embodiments of the present invention may include apparatuses for performing the operations herein. An apparatus may be specially constructed for the desired purposes, or it may comprise a general purpose device selectively activated or reconfigured by a program stored in the device.

Embodiments may be embodied in many different ways as a software component. For example, it may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application.

The following references are incorporated by reference in their entirety:

T. Pettersen, J. Pretlove, C. Skourup, T. Engedal, and T. Lokstad, "Augmented reality for programming industrial robots," in *Mixed and Augmented Reality, 2003. Proceedings. The Second IEEE and ACM International Symposium on*, October 2003, pp. 319-320.

M. Rahimi and W. Karwowski, "A research paradigm in human-robot interaction," *International journal of industrial ergonomics*, vol. 5, no. 1, pp. 59-71, 1990.

A. Aryania, B. Daniel, T. Thomessen, and G. Sziebig, "New trends in industrial robot controller user interfaces," in *Cognitive Infocommunications (CogInfoCom), 2012 IEEE 3rd International Conference on*. IEEE, 2012, pp. 365-369.

S. Pieska, J. Kaarela, and O. Saukko, "Towards easier human-robot interaction to help inexperienced operators in smes," in *Cognitive Infocommunications (CogInfoCom), 2012 IEEE 3rd International Conference on*, December 2012, pp. 333-338.

A. Kazi, J. Bunsendal, D. Haag, R. Baum, and R. Bischoff, "Next generation teach pendants for industrial robots," in *Advances in Human-Robot Interaction*. Springer, 2005, pp. 47-66.

S. Calinon, "Robot programming by demonstration," in *Springer handbook of robotics*. Springer, 2008, pp. 1371-1394.

T. Hulin, V. Schmirgel, E. Yechiam, U. E. Zimmermann, C. Preusche, and G. Pohler, "Evaluating exemplary training accelerators for programming-by-demonstration," in *RO-MAN, 2010 IEEE*. IEEE, 2010, pp. 440-445.

P. Milgram, A. Rastogi, and J. J. Grodski, "Telerobotic control using augmented reality," in *Robot and Human Communication, 1995. RO-MAN '95 TOKYO, Proceedings., 4th IEEE International Workshop on*. IEEE, 1995, pp. 21-29.

S.-K. Ong, J. Chong, and A. Y. Nee, "Methodologies for immersive robot programming in an augmented reality environment," in *Proceedings of the 4th international conference on Computer graphics and interactive techniques in Australasia and Southeast Asia*. ACM, 2006, pp. 237-244.

A. A. E., B. Akan, and B. Çürüklü, "Augmented reality meets industry: Interactive robot programming," in *SIGRAD 2010*, November 2010, pp. 55-58.

J. Lambrecht, M. Kleinsorge, M. Rosenstrauch, and J. Krüger, "Spatial programming for industrial robots through task demonstration." *International Journal of Advanced Robotic Systems*, vol. 10, 2013.

S. Tachi, H. Arai, and T. Maeda, "Tele-existence simulator with artificial reality (1)—design and evaluation of a binocular visual display using solid models—," in *Intelligent Robots, 1988., IEEE International Workshop on*, October 1988, pp. 719-724.

R. H. Jacoby and S. R. Ellis, "Using virtual menus in a virtual environment," in *SPIE/IS&T 1992 Symposium on Electronic Imaging: Science and Technology*. International Society for Optics and Photonics, 1992, pp. 39-48.

N. E. Miner and S. A. Stansfield, "An interactive virtual reality simulation system for robot control and operator training," in *Robotics and Automation, 1994. Proceedings., 1994 IEEE International Conference on*. IEEE, 1994, pp. 1428-1435.

L. Hamon, P. Lucidarme, E. Richard, and P. Richard, "Virtual reality and programming by demonstration: Teaching a robot to grasp a dynamic object by the generalization of human demonstrations," *Presence: Teleoperators and Virtual Environments*, vol. 20, no. 3, pp. 241-253, 2011.

M. Slater, V. Linakis, M. Usoh, and R. Kooper, "Immersion, presence, and performance in virtual environments: An experiment with tri-dimensional chess," in *ACM virtual reality software and technology (VRST)*. Citeseer, 1996, pp. 163-172.

F. Ferland, F. Pomerleau, C. T. Le Dinh, and F. Michaud, "Egocentric and exocentric teleoperation interface using real-time, 3d video projection," in *Human-Robot Interaction (HRI), 2009 4th ACM/IEEE International Conference on*. IEEE, 2009, pp. 37-44.

J. Scholtz, "Theory and evaluation of human robot interactions," in *System Sciences, 2003. Proceedings of the 36th Annual Hawaii International Conference on*. IEEE, 2003, pp. 10-pp.

L. B. Rosenberg, "Virtual fixtures: Perceptual tools for telerobotic manipulation," in *Virtual Reality Annual International Symposium, 1993., 1993 IEEE*. IEEE, 1993, pp. 76-82.

M. Quigley, K. Conley, B. Gerkey, J. Faust, T. Foote, J. Leibs, R. Wheeler, and A. Y. Ng, "Ros: an open-source robot operating system," in *ICRA workshop on open source software*, vol. 3, no. 3.2, 2009.

R. Belousov, R. Chellali, and G. J. Clapworthy. Virtual reality tools for internet robotics, volume 2, pages 1878-1883, 2001.

G. C. Burdea. Invited review: the synergy between virtual reality and robotics. Robotics and Automation, IEEE Transactions on, 15:400-410, 1999.

E. Freund and J. Rossmann. Projective virtual reality: Bridging the gap between virtual reality and robotics. Robotics and Automation, IEEE Transactions on, 15:411-422, 1999.

J. Funda and R. P. Paul. Efficient control of a robotic system for time-delayed environments, pages 219-224, 1991.

M. S. Kadavasal, A. Seth, and J. H. Oliver. Virtual reality based multi-modal teleoperation using mixed autonomy. ASME Conference Proceed-ings, 2008:1451-1460, 2008.

A. Kheddar, E.-S. Neo, R. Tadakuma, and K. Yokoi, volume 31, chap-ter Enhanced Teleoperation Through Virtual Reality Techniques, pages 139-159. 2007.

P. Milgram, S. Zhai, D. Drascic, and J. J. Grodski. Applications of augmented reality for human-robot communication, volume 3, pages 1467-1472, 1993.

A. Monferrer and D. Bonyuet. Cooperative robot teleoperation through virtual reality interfaces, pages 243-248, 2002.

J. Savage-Carmona, M. Billinghurst, and A. Holden. The virbot: a virtual reality robot driven with multimodal commands. Expert Systems with Applications, 15:413-419, 1998.

M. A. Sheik-Nainar, D. B. Kaber, and M.-Y. Chow. Control gain adap-tation in virtual reality mediated human-telerobot interaction. Human Factors and Ergonomics in Manufacturing & Service Industries, 15:259-274, 2005.

T. Takahashi and H. Ogata. Robotic assembly operation based on task-level teaching in virtual reality, pages 1083-1088, 1992.

H. Yamada, N. Tao, and Z. Dingxuan. Construction tele-robot system with virtual reality, pages 36-40, 2008.

European Patent App. EP 20,100,184,620, and WO Patent Application Publication Nos. PCT/IB2003/005,543 and PCT/US2009/069,350

While various embodiments of the present invention have been described above, it should be understood that they have been presented by way of example only, and not limitation. Thus, the breadth and scope of the present invention should not be limited by any of the above-described illustrative embodiments, but should instead be defined only in accordance with the following claims and their equivalents.

What is claimed is:

1. A method for programming a robot comprising:
creating an immersive virtual environment (IVE) using a virtual reality system (VRS);
receiving, by the VRS, parameters corresponding to a real-world robot;
creating, by the VRS within said IVE, a virtual robot, wherein the virtual robot is a simulation of the real-world robot based on the received parameters;
transmitting, by the VRS, a representation of said IVE to a user;
receiving, by the VRS, input from the user, wherein said VRS is configured to allow the user to interact with the virtual robot using said user input;
providing, by the VRS within said IVE, robot feedback to the user, wherein said robot feedback includes a current state of the virtual robot;
training, in the VRS, the virtual robot in the IVE by the user; and
programming, by the VRS, the real-world robot based on the virtual robot training,
wherein said IVE is configurable to define geometric primitives or detailed 3D mesh objects as overlays of real time sensing data to define geometric regions for interaction for the real-world robot.

2. The method of claim 1, wherein said virtual robot controls a plurality of real-world robots.

3. The method of claim 1, wherein said IVE is configurable to define virtual constraints for the virtual robot, wherein said virtual constraints are translated physical constraints imposed on the real-world robot.

4. The method of claim 1, wherein said IVE is configurable to display real-time 2D or 3D video or depth information on a virtual scene overlaid in a geometrically correct manner on any 3D representation in the IVE.

5. The method of claim 1, wherein said IVE is configurable to display forces applied by the robot, or other objects, as sensed by the real-world robot.

6. The method of claim 1, wherein said IVE is configurable to display a real time representation of a real life environment with an ability to seamlessly transition between the real life environment and a virtual environment.

7. The method of claim 1, wherein a plurality of users can interact with the IVE.

8. A method for programming a robot comprising:
creating an immersive virtual environment (IVE) using a virtual reality system (VRS);
receiving, by the VRS, parameters corresponding to a real-world robot;
creating, by the VRS within said IVE, a virtual robot, wherein the virtual robot is a simulation of the real-world robot based on the received parameters;
transmitting, by the VRS, a representation of said IVE to a user;
receiving, by the VRS, input from the user, wherein said VRS is configured to allow the user to interact with the virtual robot using said user input;
providing, by the VRS within said IVE, robot feedback to the user, wherein said robot feedback includes a current state of the virtual robot;
training, in the VRS, the virtual robot in the IVE by the user;
programming, by the VRS, the real-world robot based on the virtual robot training; and
training said user using IVE on said real-world robot using said virtual robot.

9. The method of claim 8, wherein said IVE is used as a sandbox for learning robot programming or task plan specification using said virtual robot.

10. A method for programming a robot comprising:
creating an immersive virtual environment (IVE) using a virtual reality system (VRS);
receiving, by the VRS, parameters corresponding to a real-world robot;
creating, by the VRS within said IVE, a virtual robot, wherein the virtual robot is a simulation of the real-world robot based on the received parameters;
transmitting, by the VRS, a representation of said IVE to a user;
receiving, by the VRS, input from the user, wherein said VRS is configured to allow the user to interact with the virtual robot using said user input;
providing, by the VRS within said IVE, robot feedback to the user, wherein said robot feedback includes a current state of the virtual robot;
training, in the VRS, the virtual robot in the IVE by the user; and
programming, by the VRS, the real-world robot based on the virtual robot training,
wherein said IVE is configurable to display forces applied by the robot, or other objects, as sensed by the real-world robot.

11. A method for programming a robot comprising:
creating an immersive virtual environment (IVE) using a virtual reality system (VRS);
receiving, by the VRS, parameters corresponding to a real-world robot;
creating, by the VRS within said IVE, a virtual robot, wherein the virtual robot is a simulation of the real-world robot based on the received parameters;
transmitting, by the VRS, a representation of said IVE to a user;

receiving, by the VRS, input from the user, wherein said VRS is configured to allow the user to interact with the virtual robot using said user input;

providing, by the VRS within said IVE, robot feedback to the user, wherein said robot feedback includes a current state of the virtual robot;

training, in the VRS, the virtual robot in the IVE by the user; and programming, by the VRS, the real-world robot based on the virtual robot training, wherein said IVE is configurable to display a real time representation of a real life environment with an ability to seamlessly transition between the real life environment and a virtual environment.

* * * * *